United States Patent
Takeda et al.

(10) Patent No.: US 7,630,038 B2
(45) Date of Patent: Dec. 8, 2009

(54) LIQUID CRYSTAL PANEL AND LIQUID CRYSTAL DISPLAY APPARATUS

(75) Inventors: Kentarou Takeda, Osaka (JP); Nao Murakami, Osaka (JP); Junichi Nagase, Osaka (JP); Toshiyuki Iida, Osaka (JP); Kentarou Yoshida, Osaka (JP)

(73) Assignee: Nitto Denko Cororation, Ibaraki-shi (JP)

( * ) Notice: Subject to any disclaimer, the term of this patent is extended or adjusted under 35 U.S.C. 154(b) by 174 days.

(21) Appl. No.: 11/913,750

(22) PCT Filed: Oct. 20, 2006

(86) PCT No.: PCT/JP2006/321462

§ 371 (c)(1),
(2), (4) Date: Nov. 6, 2007

(87) PCT Pub. No.: WO2007/055109

PCT Pub. Date: May 18, 2007

(65) Prior Publication Data

US 2009/0046228 A1    Feb. 19, 2009

(30) Foreign Application Priority Data

Nov. 10, 2005    (JP) .............................. 2005-326121

(51) Int. Cl.
*G02F 1/13363*    (2006.01)
(52) U.S. Cl. .................... 349/117; 349/118; 349/119
(58) Field of Classification Search .................. None
See application file for complete search history.

(56) References Cited

U.S. PATENT DOCUMENTS

| 6,628,359 | B1 | 9/2003 | Terashita et al. |
| 2003/0156235 | A1 | 8/2003 | Kuzuhara et al. |
| 2003/0169391 | A1 | 9/2003 | Uchida et al. |

(Continued)

FOREIGN PATENT DOCUMENTS

| JP | 5-215912 A | 8/1993 |
| JP | 2000-235185 A | 8/2000 |
| JP | 2003-240948 A | 8/2003 |
| JP | 2003-262869 A | 9/2003 |
| JP | 2003-315555 A | 11/2003 |
| JP | 2004-062023 A | 2/2004 |
| JP | 2004-157300 A | 6/2004 |
| JP | 2005-049792 A | 2/2005 |

OTHER PUBLICATIONS

International Search Report of PCT/JP2006/321462, date of mailing Dec. 12, 2006.

*Primary Examiner*—Michael Stahl
(74) *Attorney, Agent, or Firm*—Westerman, Hattori, Daniels & Adrian, LLP.

(57) ABSTRACT

There are provided a liquid crystal panel and a liquid crystal display apparatus each having an excellent screen contrast, a small color shift, and small display unevenness. The liquid crystal panel includes a liquid crystal cell; a first polarizer placed on one side of the liquid crystal cell; a second polarizer placed on the other side of the liquid crystal cell; and at least two optical compensation layers including a first optical compensation layer and a second optical compensation layer placed between the first polarizer and the second polarizer.

10 Claims, 14 Drawing Sheets

U.S. PATENT DOCUMENTS

| | | |
|---|---|---|
| 2005/0099562 A1 | 5/2005 | Nishikouji et al. |
| 2005/0123693 A1 | 6/2005 | Ito |
| 2006/0158593 A1* | 7/2006 | Sakai et al. .................. 349/122 |
| 2006/0177607 A1* | 8/2006 | Ohmori et al. .............. 428/1.31 |
| 2006/0238681 A1* | 10/2006 | Murakami et al. .......... 349/117 |
| 2007/0040963 A1* | 2/2007 | Maruyama et al. ............ 349/96 |
| 2008/0204644 A1* | 8/2008 | Toyama et al. ............... 349/118 |
| 2008/0273153 A1* | 11/2008 | Takeda et al. ................ 349/118 |

* cited by examiner

LIQUID CRYSTAL PANEL AND LIQUID CRYSTAL DISPLAY APPARATUS

TECHNICAL FIELD

The present invention relates to a liquid crystal panel and a liquid crystal display apparatus. More specifically, the present invention relates to a liquid crystal panel and a liquid crystal display apparatus, having at least two optical compensation layers between a first polarizer and a second polarizer.

BACKGROUND ART

In a VA-mode or OCE-mode liquid crystal cell, liquid crystal molecules are aligned in a vertical direction without the application of a voltage. Therefore, when the liquid crystal panel is seen in an oblique direction, the liquid crystal molecules are apparently aligned in an oblique direction, and the polarization state of light from the oblique direction changes due to the birefringence of liquid crystal, which generates light leakage from polarizing plates. Further, the polarizing plates block light by being laminated so that absorption axes thereof are perpendicular to each other. When the polarizing plates in such a laminated state are seen from the oblique direction, the absorption axes of the polarizing plates are apparently non-perpendicular state, which generates light leakage from the polarizing plates.

In order to solve the above-mentioned problem, techniques are disclosed, which compensate for the influence on light leakage caused by the birefringence of liquid crystal and the axis displacement of the polarizing plates by using biaxial optical compensation plates having a relationship: nx>ny>nz (nx represents a refractive index in a slow axis direction, ny represents a refractive index in a fast axis direction, and nz represents a refractive index in a thickness direction) (e.g. see Patent Documents 1 to 5). However, these techniques are insufficient in the enhancement of a screen contrast, the reduction of a color shift, and the suppression of display unevenness.

[Patent Document 1] JP 2003-000926 A
[Patent Document 2] JP 2003-027488 A
[Patent Document 3] JP 2003-038734 A
[Patent Document 4] JP 2002-063796 A
[Patent Document 5] JP 2002-222830 A

DISCLOSURE OF THE INVENTION

Problems to be Solved by the Invention

The present invention has been made in order to solve the above-mentioned conventional problem, and it is an object of the present invention to provide a liquid crystal panel and a liquid crystal display apparatus which have an excellent screen contrast, a small color shift, and small display unevenness without the addition of complicated means.

Means for Solving the Problems

According to one aspect of the invention, a liquid crystal panel is provided. The liquid crystal panel includes a liquid crystal cell; a first polarizer placed on one side of the liquid crystal cell; a second polarizer placed on the other side of the liquid crystal cell; and at least two optical compensation layers including a first optical compensation layer and a second optical compensation layer placed between the first polarizer and the second polarizer. The first optical compensation layer has an absolute value of an photoelastic coefficient of $40 \times 10^{-12}$ $(m^2/N)$ or less, and has relationships of the following expressions (1) and (2). The second optical compensation layer has relationships of the following expressions (3) and (4).

$$\Delta nd(380) < \Delta nd(550) < \Delta nd(780) \quad (1)$$

$$nx > ny \geqq nz \quad (2)$$

$$Rth(380) > Rth(550) > Rth(780) \quad (3)$$

$$nx = ny > nz \quad (4).$$

In one embodiment of the invention, the first optical compensation layer has a relationship of $\Delta nd(780)/\Delta nd(550) > 1.10$.

In another embodiment of the invention, the first optical compensation layer contains a cellulose-based material.

In still another embodiment of the invention, an acetyl substitution degree (DSac) and a propionyl substitution degree (DSpr) of the cellulose-based material are $2.0 \leqq DSac+DSpr \leqq 3.0$, and $1.0 \leqq DSpr \leqq 3.0$.

In still another embodiment of the invention, the second optical compensation layer has a relationship of $Rth(780)/Rth(550) < 0.95$.

In still another embodiment of the invention, the second optical compensation layer is composed of a material including at least one kind of non-liquid crystalline polymer selected from the group consisting of polyamide, polyimide, polyester, polyetherketone, polyamideimide, and polyesteramide.

Instill another embodiment of the invention, the first optical compensation layer and the second optical compensation layer are placed on separate sides with respect to the liquid crystal cell.

In still another embodiment of the invention, the first optical compensation layer has a relationship of $90 \text{ nm} \leqq \Delta nd(550) \leqq 200 \text{ nm}$, and functions as a protective layer on a liquid crystal cell side of one of the first polarizer and second polarizer.

In still another embodiment of the invention, the liquid crystal panel further includes a protective layer having relationships of the following expressions (5) and (6) on a liquid crystal cell side of one of the first polarizer and second polarizer, the first optical compensation layer being placed on the liquid crystal cell side of the protective layer, and the first optical compensation layer having a relationship of $50 \text{ nm} \leqq \Delta nd(550) \leqq 150 \text{ nm}$.

$$0 \text{ nm} \leqq \Delta nd(550) \leqq 10 \text{ nm} \quad (5)$$

$$40 \text{ nm} \leqq Rth(550) \leqq 80 \text{ nm} \quad (6).$$

In still another embodiment of the invention, the liquid crystal cell is in a VA mode or an OCB mode.

According to another aspect of the invention, a liquid crystal display apparatus is provided. The liquid crystal display apparatus includes the liquid crystal panel.

EFFECTS OF THE INVENTION

As described above, according to the present invention, by placing a first optical compensation layer and a second optical compensation layer having the above-mentioned optical characteristics between a first polarizer and a second polarizer, the screen contrast can be enhanced and the color shift can be reduced. Further, by placing a first optical compensation layer with an absolute value of a photoelastic coefficient of $40 \times 10^{-12}$ $(m^2/N)$ or less, non-uniformity of the retardation caused by the contraction stress of a polarizer and the heat of a backlight can be prevented to suppress display unevenness. Consequently, a liquid crystal panel and a liquid crystal display apparatus can be provided, which has an excellent screen contrast, a small color shift, and small display unevenness without the addition of complicated means.

DESCRIPTION OF REFERENCE NUMERALS

Figure 1A:
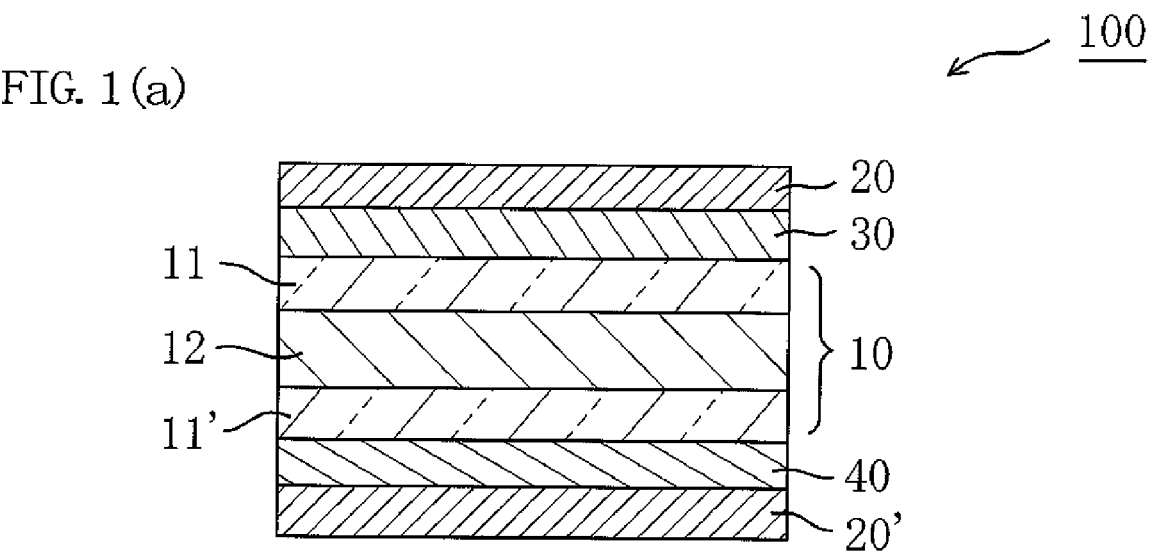
[FIG. 1] Parts (a) and (b) are schematic cross-sectional views of a liquid crystal panel according to a preferred embodiment of the present invention.

10 liquid crystal cell
20 first polarizer
20' second polarizer
30 first optical compensation layer
40 second optical compensation layer
50 protective layer
11, 11' substrate
12 liquid crystal layer
100 liquid crystal panel

BEST MODE FOR CARRYING OUT THE INVENTION

Hereinafter, preferred embodiments of the present invention will be described. However, the present invention is not limited to these embodiments.

(Definitions of Terms and Symbols)

The definitions of terms and symbols of this specification are as follows:

(1) The symbol "nx" refers to a refractive index in a direction providing a maximum in-plane refractive index (that is, a slow axis direction), and the symbol "ny" refers to a refractive index in a direction perpendicular to the slow axis in-plane (that is, a fast axis direction). The symbol "nz" refers to a refractive index in a thickness direction. Further, the expression "nx=ny", for example, not only refers to a case where nx and ny are exactly equal but also includes a case where nx and ny are substantially equal. In this specification, the phrase "substantially equal" includes a case where nx and ny differ within a range providing no effects on overall polarizing characteristics of a liquid crystal panel in practical use.

(2) The term "in-plane retardation $\Delta nd$ (550)" refers to an in-plane retardation value of a layer (film) measured at 23° C. by using light having a wavelength of 550 nm. $\Delta nd$ (550) can be determined from an expression $\Delta nd=(nx-ny)\times d$, where nx and ny represent refractive indices of a layer (film) at a wavelength of 550 nm in a slow axis direction and a fast axis direction, respectively, and d (nm) represents a thickness of the layer (film). The term "in-plane retardation $\Delta nd$ (380)" refers to a retardation value in a plane of a layer (film) measured with light having a wavelength of 380 nm at 23° C., and the "in-plane retardation $\Delta nd$ (780)" refers to a retardation value in a plane of a layer (film) measured with light having a wavelength of 780 nm at 23° C.

(3) The term "thickness direction retardation Rth (550)" refers to a thickness direction retardation value measured at 23° C. by using light of a wavelength of 550 nm. Rth (550) can be determined from an expression $Rth=(nx-nz)\times d$, where nx and nz represent refractive indices of a layer (film) at a wavelength of 550 nm in a slow axis direction and a thickness direction, respectively, and d (nm) represents a thickness of the layer (film). The term "thickness direction retardation Rth (380)" refers to a thickness direction retardation value measured with light having a wavelength of 380 nm at 23° C., and the term "thickness direction retardation Rth (780)" refers to a thickness direction retardation value measured with light having a wavelength of 780 nm at 23° C.

A. Entire Configuration of a Liquid Crystal Panel

Figure 1B:
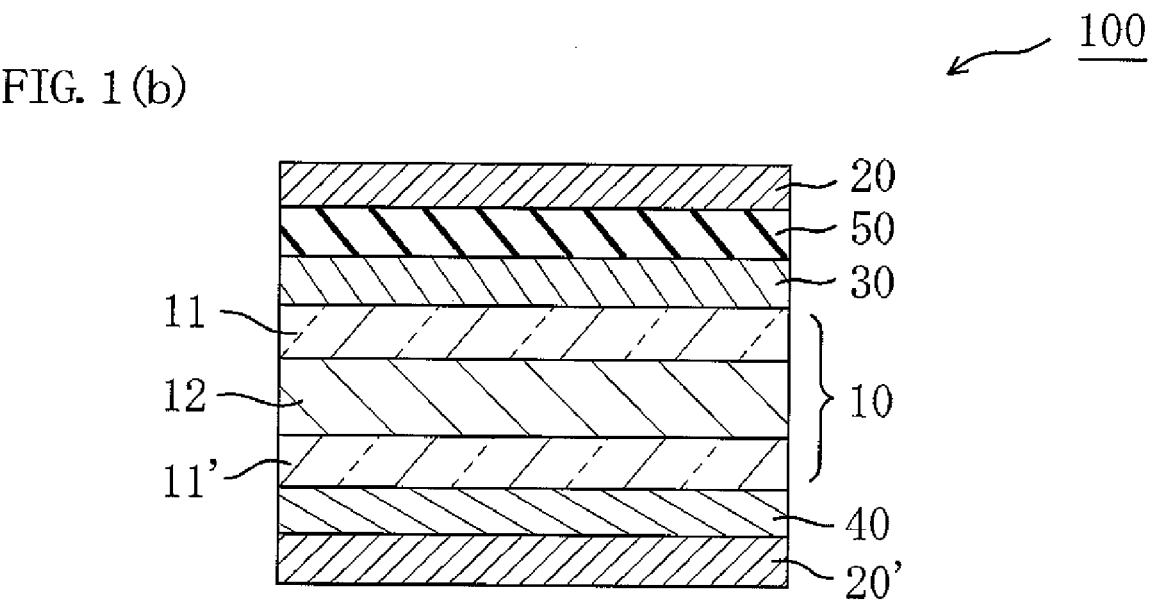

FIG. 1(a) is a schematic cross-sectional view of a liquid crystal panel according to one embodiment of the present invention. The liquid crystal panel 100 includes a liquid crystal cell 10, a first polarizer 20 placed on one side (viewer side in an illustrative figure) of the liquid crystal cell 10, a second polarizer 20' placed on the other side (backlight side in the illustrative figure) of the liquid crystal cell 10, and at least two optical compensation layers placed between the first polarizer 20 and the second polarizer 20'. The at least two optical compensation layers include a first optical compensation layer 30 and a second optical compensation layer 40. In the illustrated figure, the first optical compensation layer 30 is placed between the first polarizer 20 and the liquid crystal cell 10, and the second optical compensation layer 40 is placed between the second polarizer 20' and the liquid crystal cell 10. According to such an embodiment, the first optical compensation layer 30 can function as a protective layer on the liquid crystal cell side of the first polarizer 20, which can contribute to thinning of the liquid crystal panel (finally, a liquid crystal display apparatus). FIG. 1(b) is a schematic cross-sectional view of a liquid crystal panel according to another embodiment of the present invention. In the present embodiment, a protective layer 50 is provided between the first polarizer 20 and the first optical compensation layer 30. The protective layer 50 is adjacent to the liquid crystal cell side of the first polarizer 20, and the first optical compensation layer 30 is adjacent to the liquid crystal cell side of the protective layer 50. According to such an embodiment, by providing the protective layer 50, the degradation of the polarizers is prevented remarkably, whereby a liquid crystal panel excellent in durability can be obtained. The first optical compensation layer 30 may be placed on the backlight side, and the second optical compensation layer 40 may be placed on the viewer side. Preferably, the first optical compensation layer 30 is placed on the viewer side as illustrated. This is because the influence caused by the heat of the backlight is reduced to allow the effects of the present invention to be exhibited more.

Figure 2A:
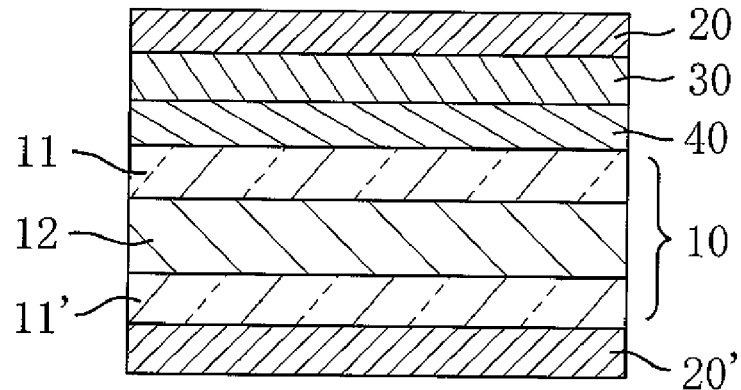
[FIG. 2] Parts (a) and (b) are schematic cross-sectional views of a liquid crystal panel according to another preferred embodiment of the present invention.
Figure 2B:
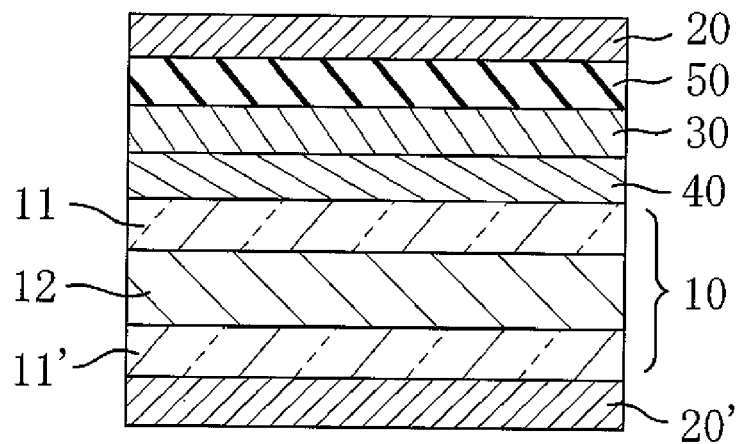

FIG. 2(a) is a cross-sectional view of a liquid crystal panel according to still another embodiment of the present invention. In this embodiment, the first optical compensation layer 30 and the second optical compensation layer 40 are placed between the first polarizer 20 and the liquid crystal cell 10. According to such an embodiment, the first optical compensation layer 30 can function as a protective layer on the liquid crystal cell side of the first polarizer 20, which can contribute to thinning of a liquid crystal panel (finally, a liquid crystal display apparatus). FIG. 2(b) is a schematic cross-sectional view of the liquid crystal panel according to still another embodiment of the present invention. In this embodiment, the protective layer 50 is provided between the first polarizer 20 and the first optical compensation layer 30. The protective layer 50 is adjacent to the liquid crystal cell side of the first polarizer 20, and the first optical compensation layer 30 is adjacent to the liquid crystal cell side of the protective layer 50. According to such an embodiment, by providing the protective layer 50, the degradation of the polarizers is prevented remarkably, whereby a liquid crystal panel excellent in durability can be obtained. The first optical compensation layer 30 and the second optical compensation layer 40 may be replaced with each other in arrangement.

As shown in FIGS. 1(a) and 1(b), it is preferred that the first optical compensation layer 30 and the second optical compensation layer 40 are placed on separate sides with respect to the liquid crystal cell 10. This is because product design can be conducted without considering a method of laminating the first optical compensation layer 30 and the second optical compensation layer 40, and excellent productivity can be obtained. The detail of each constituent member and each layer shown in FIGS. 1(a) to (b) and FIGS. 2(a) to (b) will be described later in B-1 to B-4.

In the present invention, if required, any appropriate protective film (not shown) is provided between the first polarizer 20 or the second polarizer 20' and the second optical compensation layer 40. Further, if required, on the side of the first polarizer 20 and/or the second polarizer 20' where an optical compensation layer is not formed, any appropriate protective film is also provided. By providing the protective film, the degradation of the polarizers can be prevented. According to the present invention, still another optical compensation layer (not shown) may be provided. The kind, number, arrangement position, and the like of such an optical compensation layer can be selected appropriately depending upon the purpose.

The liquid crystal cell 10 includes a pair of glass substrates 11, 11' and a liquid crystal layer 12 as a display medium placed between the substrates. On one substrate (color filter substrate) 11, a color filter and a black matrix (both not shown) are provided. On the other substrate (active matrix substrate) 11', switching elements (typically, TFT) for controlling the electrooptical characteristics of liquid crystal; scanning lines that provide a gate signal to the switching elements; signal lines that give a source signal thereto and pixel electrode are provided (all not shown). The color filter may be provided on the active matrix substrate 11'. The gap (cell gap) between the substrates 11 and 11' is controlled with spacers (not shown). On each side of the substrates 11 and 11', which is in contact with the liquid crystal layer 12, an alignment film (not shown) made of, for example, polyimide is provided.

As the driving mode of the liquid crystal cell 10, any appropriate driving mode can be adopted, as long as the effects of the present invention are obtained. Specific examples of the driving mode include a super twisted nematic (STN) mode, a twisted nematic (TN) mode, an in-plane switching (IPS) mode, a vertical aligned (VA) mode, an optically aligned birefringence (OCB) mode, a hybrid aligned nematic (HAN) mode, and an axially symmetric aligned microcell (ASM) mode. VA mode and OCB mode are preferred.

Figure 3A:
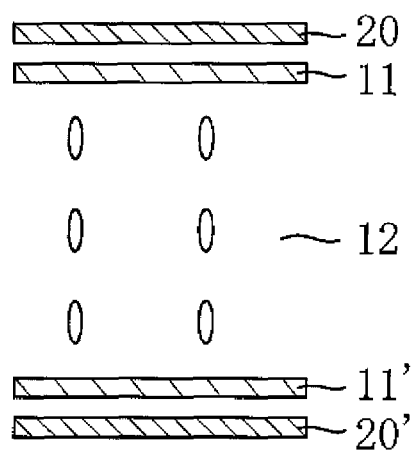
[FIG. 3] Parts (a) and (b) are schematic cross-sectional views illustrating the alignment state of liquid crystal molecules of a liquid crystal layer in the case where a liquid crystal display apparatus of the present invention adopts a VA-mode liquid crystal cell.
Figure 3B:
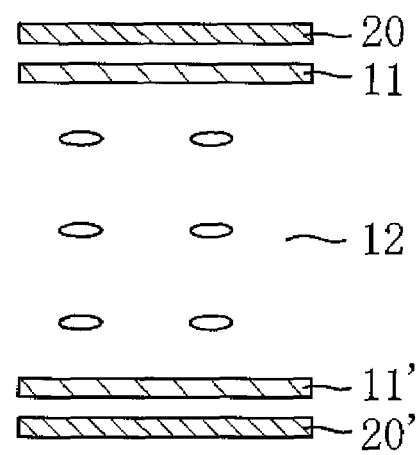

FIGS. 3(a) and 3(b) are each a schematic sectional view illustrating an alignment state of liquid crystal molecules in a VA mode. As shown in FIG. 3(a), liquid crystal molecules are aligned vertically to the substrates 11 and 11' without application of a voltage. Such vertical alignment is realized by arranging nematic liquid crystal having negative dielectric anisotropy between the substrates each having a vertical alignment film formed thereon (not shown). When light (specifically, linear polarized light which passed through the first polarizer 20) enters the liquid crystal layer 12 in such a state from a surface of one substrate 11, the incident light advances along a longitudinal direction of the vertically aligned liquid crystal molecules. No birefringence occurs in the longitudinal direction of the liquid crystal molecules, and thus the incident light advances without changing a polarization direction and is absorbed by the second polarizer 20' having a polarizing axis perpendicular to the first polarizer 20. In this way, a dark state is displayed without application of a voltage (normally black mode). As shown in FIG. 3(b), longitudinal axes of the liquid crystal molecules orientate parallel to the substrate surfaces when a voltage is applied between the electrodes. The liquid crystal molecules exhibit birefringence with linear polarized light entering the liquid crystal layer 12 in such a state, and a polarization state of the incident light changes in accordance with inclination of the liquid crystal molecules. Light passing through the liquid crystal layer during application of a predetermined maximum voltage is converted into linear polarized light having a polarization direction rotated by 90°, for example. Thus, the light passes through the second polarizer 20', and a bright state is displayed. Upon termination of voltage application, the display is returned to a dark state by an alignment restraining force. An applied voltage is changed to control inclination of the liquid crystal molecules, so as to change an intensity of light transmission from the second polarizer 20'. As a result, display of gradation can be realized.

Figure 4A:
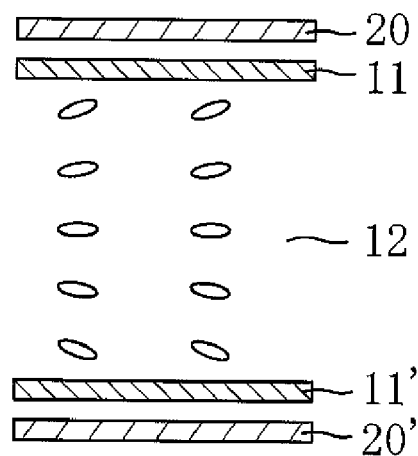
[FIG. 4] Parts (a) to (d) are schematic cross-sectional views illustrating the alignment state of liquid crystal molecules of a liquid crystal layer in a case where the liquid crystal display apparatus of the present invention adopts an OCB-mode liquid crystal cell.
Figure 4B:
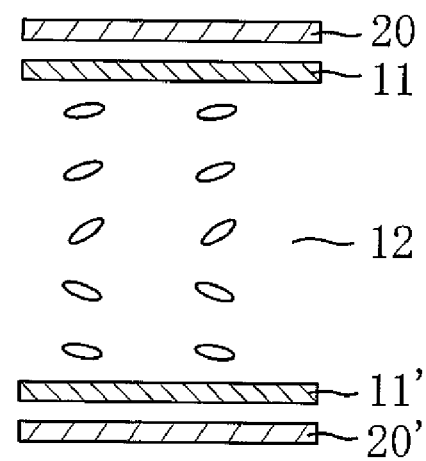
Figure 4C:
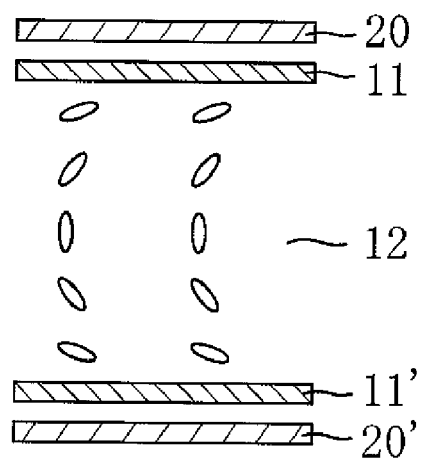
Figure 4D:
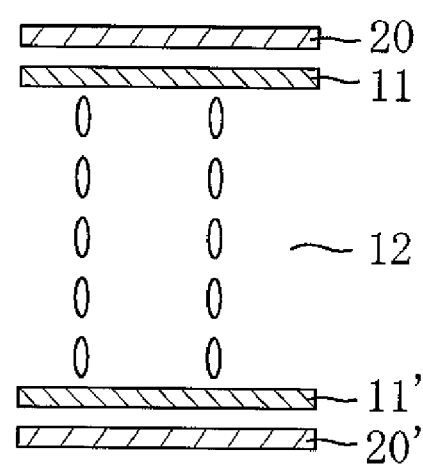

FIGS. 4(a) to 4(d) are each a schematic sectional view illustrating an alignment state of liquid crystal molecules in an OCB mode. The OCB mode is a display mode in which the liquid crystal layer 12 is constituted by so-called bend alignment. As shown in FIG. 4(c), the bend alignment refers to an alignment state wherein: nematic liquid crystal molecules are aligned at a substantially parallel angle (alignment angle) in the vicinity of a substrate; the alignment angle of the liquid crystal molecules becomes vertical to a substrate plane toward the center of the liquid crystal layer; and the alignment angle changes successively and continuously to parallel with a facing substrate surface away from the center of the liquid crystal layer. Further, the bend alignment refers to an alignment state having no twist structure across the entire liquid crystal layer. Such bend alignment is formed as follows. As shown in FIG. 4(a), the liquid crystal molecules have a substantially homogeneous alignment in a state without application of an electric field or the like (initial state). However, the liquid crystal molecules each have a pretilt angle, and a pretilt angle in the vicinity of the substrate is different from a pretilt angle in the vicinity of the opposite substrate. A predetermined bias voltage (generally 1.5 V to 1.9 V) is applied (low voltage application) to the liquid crystal molecules, to thereby realize spray alignment as shown in FIG. 4(b) and then into bend alignment as shown in FIG. 4(c). Then, a display voltage (generally 5 V to 7 V) is applied (high voltage application) to the state of bend alignment, and thus the liquid crystal molecules align/stand substantially vertical to the substrate surface as shown in FIG. 4(d). In a normally white display mode, light entering the liquid crystal layer in a state shown in FIG. 4(d) during high voltage application through the first polarizer 20 advances without changing a polarization direction and is absorbed by the second polarizer 20', to thereby display a dark state. Upon reduction of a display voltage, the alignment is returned to bend alignment to display a bright state by an alignment restraining force of rubbing treatment. A display voltage is changed to control inclination of the liquid crystal molecules, so as to change an intensity of light transmission from the polarizing plate. As a result, display of gradation can be realized. The liquid crystal display apparatus provided with an OCB mode liquid crystal cell allows switching of phase transition from a spray alignment state to a bend alignment state at a very high speed, and has excellent dynamic image display characteristics compared to those of a liquid crystal display apparatus provided with a liquid crystal cell of another drive mode such as a TN mode or an IPS mode.

B-1. First Optical Compensation Layer

The absolute value of a photoelastic coefficient of the first optical compensation layer is $40 \times 10^{-12}$ m/N or less, more preferably $0.2 \times 10^{-12}$ to $35 \times 10^{-12}$, and most preferably $0.2 \times 10^{-12}$ to $30 \times 10^{-12}$. If the absolute value of the photoelastic coefficient is in such a range, display unevenness can be suppressed effectively.

The first optical compensation layer has a refractive index profile of $nx>ny \geq nz$. Further, the first optical compensation layer has wavelength dependence of so-called reverse wavelength dispersion. Specifically, an in-plane retardation thereof has a relationship: $\Delta nd(380)<\Delta nd(550)<\Delta nd(780)$. Preferably, the in-plane retardation has a relationship: $\Delta nd(780)/\Delta nd(550)>1.10$. Because of such a relationship, satisfactory optical compensation over a wide range of visible light can be realized. It is one of the features of the present invention that a liquid crystal panel having an optical compensation layer which satisfies both the above-mentioned low photoelastic coefficient and the reverse wavelength dispersion characteristics is realized.

As shown in FIG. 1(a) or 2(a), in an embodiment in which the first optical compensation layer can function as a protective layer on the liquid crystal cell side of the first polarizer or the second polarizer, the lower limit of the in-plane retardation $\Delta nd(550)$ of the first optical compensation layer is preferably 90 nm or more, more preferably 120 nm or more, and most preferably 130 nm or more. On the other hand, the upper limit of $\Delta nd(550)$ is preferably 200 nm or less, more preferably 170 nm or less, and most preferably 160 nm or less. Further, in this embodiment, the lower limit of a thickness direction retardation $Rth(550)$ of the first optical compensation layer is preferably 120 nm or more, more preferably 140 nm or more, and most preferably 160 nm or more. On the other hand, the upper limit of $Rth(550)$ is preferably 250 nm or less, more preferably 230 nm or less, and most preferably 210 nm or less.

As shown in FIG. 1(b) or 2(b), in an embodiment in which the protective layer is provided between the first polarizer or the second polarizer and the first optical compensation layer, and the first optical compensation layer is adjacent to the liquid crystal side of the protective layer, the lower limit of the in-plane retardation $\Delta nd(550)$ of the first optical compensation layer is preferably 50 nm or more, more preferably 70 nm or more, and most preferably 75 nm or more. On the other hand, the upper limit of $\Delta nd(550)$ is preferably 150 nm or less, more preferably 110 nm or less, and most preferably 100 nm or less. Further, in this embodiment, the lower limit of the thickness direction retardation $Rth(550)$ of the first optical compensation layer is preferably 50 nm or more, more preferably 70 nm or more, and most preferably 75 nm or more. On the other hand, the upper limit of $Rth(550)$ is preferably 150 nm or less, more preferably 130 nm or less, and most preferably 110 nm or less.

As the thickness of the first optical compensation layer, any appropriate thickness can be adopted as long as the effects of the present invention are exhibited. Specifically, the thickness is preferably 20 to 160 μm, more preferably 40 to 140 μm, and most preferably 60 to 120 μm.

The first optical compensation layer can be formed typically by subjecting a polymer film to stretching process. By appropriately selecting, for example, the kind of a polymer, stretching conditions, a stretching method, and the like, a first optical compensation layer having the above-mentioned optical characteristics (refractive index profile, in-plane retardation, photoelastic coefficient) can be obtained.

Although any appropriate material can be adopted as a material contained in the above-mentioned polymer film, it is preferred that a cellulose-based material is contained in the polymer film.

It is preferred that the above-mentioned cellulose-based material is substituted with an acetyl group and a propionyl group. The lower limit of a substitution degree of the cellulose-based material "DSac (acetyl substitution degree)+DSpr (propionyl substitution degree)" (representing the average numbers of an acetyl group or a propionyl group substitutes for three hydroxyl groups present in a repeating unit of cellulose) is preferably 2 or more, more preferably 2.3 or more, and most preferably 2.6 or more. The upper limit of "DSac+DSpr" is preferably 3 or less, more preferably 2.9 or less, and most preferably 2.8 or less. By setting the substitution degree of the cellulose-based material in the above range, an optical compensation layer having the above-mentioned desired refractive index profile can be obtained.

The lower limit of the above-mentioned DSpr (propionyl substitution degree) is preferably 1 or more, more preferably 2 or more, and most preferably 2.5 or more. The upper limit of the DSpr is preferably 3 or less, more preferably 2.9 or less, and most preferably 2.8 or less. By setting the DSpr in the above range, the solubility of the cellulose-based material with respect to a solvent is enhanced, which facilitates the control of the thickness of the first optical compensation layer to be obtained. Further, by setting the "DSac+DSpr" in the above range and setting the DSpr in the above range, an optical compensation layer having the above-mentioned optical characteristics and reverse wavelength dispersion characteristics can be obtained.

The above-mentioned DSac (acetyl substitution degree) and DSpr (propionyl substitution degree) can be obtained by the method described in paragraphs [0016] to [0019] of JP 2003-315538 A.

The above-mentioned cellulose-based material can have other substituents other than an acetyl group and a propionyl group. Examples of the other substituents include ester groups such as butylate, and ether groups such as an alkyl ether group and an aralkylene ether group.

The number average molecular weight of the above-mentioned cellulose-based material is preferably 5,000 to 100,000, and more preferably 10,000 to 70,000. By setting the number average molecular weight in the above range, excellent productivity and satisfactory mechanical strength can be obtained.

As the method for substituting an acetyl group and a propionyl group for the cellulose-based material, any method is adopted appropriately. For example, cellulose is treated with a strong caustic soda solution to obtain alkali cellulose, which is acylated with a mixture of a predetermined amount of acetic anhydride and propionic anhydride. An acyl group is partially hydrolyzed to adjust the substitution degree "DSac+ DSpr".

The above-mentioned polymer film can contain any polymer material appropriately. Examples of such a polymer material include cellulose esters such as cellulose butylate, and cellulose ethers such as methyl cellulose and ethyl cellulose. The polymer film can contain additives such as a plasticizer, a heat stabilizer, and a UV-ray stabilizer as required.

B-2. Second Optical Compensation Layer

The second optical compensation layer has a refractive index profile: nx=ny>nz. Further, the thickness direction retardation of the second optical compensation layer has a relationship: Rth (380)>Rth(550)>Rth(780). Preferably, the thickness direction retardation has a relationship: Rth(780)/Rth(550)<0.95.

The lower limit of the thickness direction retardation Rth (550) of the second optical compensation layer is preferably 10 nm or more, more preferably 20 nm or more, and most preferably 50 nm or more. On the other hand, the upper limit of Rth(550) is preferably 1000 nm or less, more preferably 500 nm or less, and most preferably 250 nm or less. The upper limit of the in-plane retardation Δnd (550) of the second optical compensation layer is 10 nm or less, preferably 5 nm or less, and most preferably 3 nm or less.

The second optical compensation layer may be a single layer or a laminate of at least two layers. In the case of the laminate, a material constituting each layer and the thickness of each layer can be set appropriately, as long as the second optical compensation layer has the above-mentioned optical characteristics as the entire laminate.

As the thickness of the second optical compensation layer, any appropriate thickness can be adopted as long as the effects of the present invention are exhibited. Specifically, the thickness is preferably 0.1 to 50 μm, more preferably 0.5 to 30 μm, and most preferably 1 to 10 μm.

Any suitable materials may be employed as a material constituting the second optical compensation layer as long as the second optical compensation layer has the above optical characteristics. An example of such a material includes a non-liquid crystalline material. The material is particularly preferably a non-liquid crystalline polymer. The non-liquid crystalline material differs from a liquid crystalline material and may form an optically uniaxial film with nx=ny>nz as property of the non-liquid crystalline material, regardless of orientation of the substrate. As a result, the non-liquid crystalline material may employ not only an orientated substrate, but also an unorientated substrate in a step of forming the second optical compensation layer. Further, a step of applying an orientation film on a substrate surface, a step of laminating an orientation film, or the like may be omitted even when an unorientated substrate is employed.

A preferred example of the non-liquid crystalline material includes a polymer such as polyamide, polyimide, polyester, polyetherketone, polyamideimide, or polyesteramide since such a material has excellent thermal resistance, excellent chemical resistance, excellent transparency, and sufficient rigidity. One type of polymer may be used, or a mixture of two or more types thereof having different functional groups such as a mixture of polyaryletherketone and polyamide may be used. Of those, polyimide is particularly preferred in view of high transparency, high orientation, and high extension.

A molecular weight of the polymer is not particularly limited. However, the polymer has a weight average molecular weight (Mw) of preferably within a range of 1,000 to 1,000,000, more preferably within a range of 2,000 to 500,000, for example.

Polyimide which has high in-plane orientation and which is soluble in an organic solvent is preferred as polyimide used in the present invention, for example. More specifically, a polymer disclosed in JP 2000-511296 A, containing a condensation polymerization product of 9,9-bis(aminoaryl)fluorene and aromatic tetracarboxylic dianhydride, and containing at least one repeating unit represented by the following formula (1) can be used.

[Chem 1]

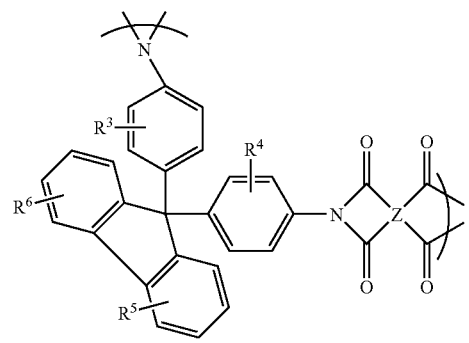

(1)

In the above formula (1), $R^3$ to $R^6$ independently represent at least one type of substituent selected from hydrogen, a halogen, a phenyl group, a phenyl group substituted with 1 to 4 halogen atoms or 1 to 4 alkyl groups each having 1 to 10 carbon atoms, and an alkyl group having 1 to 10 carbon atoms. Preferably, $R^3$ to $R^6$ independently represent at least one type of substituent selected from a halogen, a phenyl group, a phenyl group substituted with 1 to 4 halogen atoms or 1 to 4 alkyl groups each having 1 to 10 carbon atoms, and an alkyl group having 1 to 10 carbon atoms.

In the above formula (1), Z represents a tetravalent aromatic group having 6 to 20 carbon atoms, and preferably represents a pyromellitic group, a polycyclic aromatic group, a derivative of the polycyclic aromatic group, or a group represented by the following formula (2), for example.

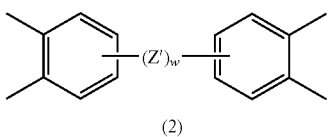

[Chem 2]

(2)

In the above formula (2), Z' represents a covalent bond, a $C(R^7)_2$ group, a CO group, an O atom, an S atom, an $SO_2$ group, an Si $(C_2H_5)_2$ group, or an $NR^8$ group. A plurality of Z's may be the same or different from each other. w represents an integer of 1 to 10. $R^7$s independently represent hydrogen or a $C(R^9)_3$ group. $R^8$ represents hydrogen, an alkyl group having 1 to about 20 carbon atoms, or an aryl group having 6 to 20 carbon atoms. A plurality of $R^8$s may be the same or different from each other. $R^9$s independently represent hydrogen, fluorine, or chlorine.

An example of the polycyclic aromatic group includes a tetravalent group derived from naphthalene, fluorene, benzofluorene, or anthracene. An example of the substituted derivative of the polycyclic aromatic group includes the above polycyclic aromatic group substituted with at least a group selected from an alkyl group having 1 to 10 carbon atoms, a fluorinated derivative thereof, and a halogen such as F or Cl.

Other examples of the polyimide include: a homopolymer disclosed in JP 08-511812 A and containing a repeating unit represented by the following general formula (3) or (4); and polyimide disclosed therein and containing a repeating unit represented by the following general formula (5). Note that, polyimide represented by the following formula (5) is a preferred form of the homopolymer represented by the following formula (3).

In the above general formulae (3) to (5), G and G' independently represent a covalent bond, a $CH_2$ group, a $C(CH_3)_2$ group, a $C(CF_3)_2$ group, a $C(CX_3)_2$ group (wherein, X represents a halogen), a CO group, an O atom, an S atom, an $SO_2$ group, an Si $(CH_2CH_3)_2$ group, or an $N(CH_3)$ group, for example. G and G' may be the same or different from each other.

In the above formulae (3) and (5), L is a substituent, and d and a each represent the number of the substituents. L represents a halogen, an alkyl group having 1 to 3 carbon atoms, a halogenated alkyl group having 1 to 3 carbon atoms, a phenyl group, or a substituted phenyl group, for example. A plurality of Ls may be the same or different from each other. An example of the substituted phenyl group includes a substituted phenyl group having at least one type of substituent selected from a halogen, an alkyl group having 1 to 3 carbon atoms, and a halogenated alkyl group having 1 to 3 carbon atoms, for example. Examples of the halogen include fluorine, chlorine, bromine, and iodine. d represents an integer of 0 to 2, and e represents an integer of 0 to 3.

In the above formulae (3) to (5), Q is a substituent, and f represents the number of the substituents. Q represents an atom or a group selected from hydrogen, a halogen, an alkyl group, a substituted alkyl group, a nitro group, a cyano group, a thioalkyl group, an alkoxy group, an aryl group, a substituted aryl group, an alkyl ester group, and a substituted alkyl ester group, for example. A plurality of Qs may be the same or different from each other. Examples of the halogen include fluorine, chlorine, bromine, and iodine. An example of the substituted alkyl group includes a halogenated alkyl group. An example of the substituted aryl group includes a halogenated aryl group. f represents an integer of 0 to 4, and g represents an integer of 0 to 3. h represents an integer of 1 to 3. g and h are each preferably larger than 1.

In the above formula (4), $R^{10}$ and $R^{11}$ independently represent an atom or a group selected from hydrogen, a halogen, a phenyl group, a substituted phenyl group, an alkyl group, and a substituted alkyl group. Preferably, $R^{10}$ and $R^{11}$ independently represent a halogenated alkyl group.

In the above formula (5), $M^1$ and $M^2$ independently represent a halogen, an alkyl group having 1 to 3 carbon atoms, a halogenated alkyl group having 1 to 3 carbon atoms, a phenyl group, or a substituted phenyl group, for example. Examples of the halogen include fluorine, chlorine, bromine, and

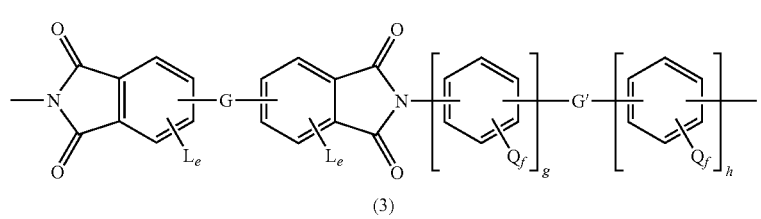

[Chem 3]

(3)

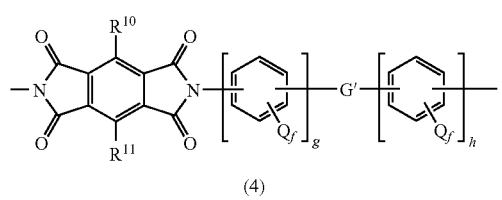

[Chem 4]

(4)

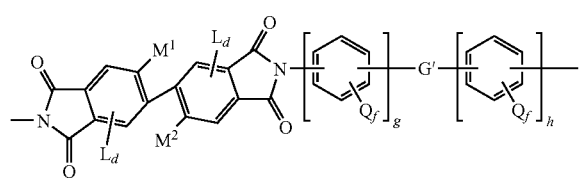

[Chem 5]

(5)

iodine. An example of the substituted phenyl group includes a substituted phenyl group having at least one type of substituent selected from the group consisting of a halogen, an alkyl group having 1 to 3 carbon atoms, and a halogenated alkyl group having 1 to 3 carbon atoms.

A specific example of the polyimide represented by the above formula (3) includes a compound represented by the following formula (6).

[Chem 6]

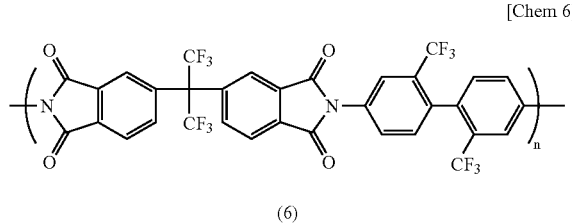

(6)

Another example of the polyimide includes a copolymer prepared through arbitrary copolymerization of acid dianhydride having a skeleton (repeating unit) other than that as described above and diamine.

An example of the acid dianhydride includes an aromatic tetracarboxylic dianhydride. Examples of the aromatic tetracarboxylic dianhydride include pyromellitic dianhydride, benzophenone tetracarboxylic dianhydride, naphthalene tetracarboxylic dianhydride, heterocyclic aromatic tetracarboxylic dianhydride, and 2,2'-substituted biphenyltetracarboxylic dianhydride.

Examples of the pyromellitic dianhydride include: pyromellitic dianhydride; 3,6-diphenyl pyromellitic dianhydride; 3,6-bis(trifluoromethyl)pyromellitic dianhydride; 3,6-dibromopyromellitic dianhydride; and 3,6-dichloropyromellitic dianhydride. Examples of the benzophenone tetracarboxylic dianhydride include: 3,3',4,4'-benzophenone tetracarboxylic dianhydride; 2,3,3',4'-benzophenone tetracarboxylic dianhydride; and 2,2',3,3'-benzophenone tetracarboxylic dianhydride. Examples of the naphthalene tetracarboxylic dianhydride include: 2,3,6,7-naphthalene tetracarboxylic dianhydride; 1,2,5,6-naphthalene tetracarboxylic dianhydride; and 2,6-dichloronaphthalene-1,4,5,8-tetracarboxylic dianhydride. Examples of the heterocyclic aromatic tetracarboxylic dianhydride include: thiophene-2,3,4,5-tetracarboxylic dianhydride; pyrazine-2,3,5,6-tetracarboxylic dianhydride; and pyridine-2,3,5,6-tetracarboxylic dianhydride. Examples of the 2,2'-substituted biphenyltetracarboxylic dianhydride include: 2,2'-dibromo-4,4',5,5'-biphenyltetracarboxylic dianhydride; 2,2'-dichloro-4,4',5,5'-biphenyltetracarboxylic dianhydride; and 2,2'-bis(trifluoromethyl)-4,4',5,5'-biphenyltetracarboxylic dianhydride.

Further examples of the aromatic tetracarboxylic dianhydride include: 3,3',4,4'-biphenyltetracarboxylic dianhydride; bis(2,3-dicarboxyphenyl)methane dianhydride; bis(2,5,6-trifluoro-3,4-dicarboxyphenyl)methane dianhydride; 2,2-bis(3,4-dicarboxyphenyl)-1,1,1,3,3,3-hexafluoropropane dianhydride; 4,4'-bis(3,4-dicarboxyphenyl)-2,2-diphenylpropane dianhydride; bis(3,4-dicarboxyphenyl)ether dianhydride; 4,4'-oxydiphthalic dianhydride; bis(3,4-dicarboxyphenyl) sulfonic dianhydride; 3,3',4,4'-diphenylsulfone tetracarboxylic dianhydride; 4,4'-[4,4'-isopropylidene-di(p-phenyleneoxy)]bis(phthalic anhydride); N,N-(3,4-dicarboxyphenyl)-N-methylamine dianhydride; and bis(3,4-dicarboxyphenyl)diethylsilane dianhydride.

Of those, the aromatic tetracarboxylic dianhydride is preferably 2,2'-substituted biphenyltetracarboxylic dianhydride, more preferably 2,2'-bis(trihalomethyl)-4,4',5,5'-biphenyltetracarboxylic dianhydride, and furthermore preferably 2,2'-bis(trifluoromethyl)-4,4',5,5'-biphenyltetracarboxylic dianhydride.

An example of the diamine includes aromatic diamine. Specific examples of the aromatic diamine include benzenediamine, diaminobenzophenone, naphthalenediamine, heterocyclic aromatic diamine, and other aromatic diamines.

Examples of the benzenediamine include benzenediamines such as o-, m-, or p-phenylenediamine, 2,4-diaminotoluene, 1,4-diamino-2-methoxybenzene, 1,4-diamino-2-phenylbenzene, and 1,3-diamino-4-chlorobenzene. Examples of the diaminobenzophenone include 2,2'-diaminobenzophenone and 3,3'-diaminobenzophenone. Examples of the naphthalenediamine include 1,8-diaminonaphthalene and 1,5-diaminonaphthalene. Examples of the heterocyclic aromatic diamine include 2,6-diaminopyridine, 2,4-diaminopyridine, and 2,4-diamino-S-triazine.

Further examples of the aromatic diamine include: 4,4'-diaminobiphenyl; 4,4'-diaminodiphenylmethane; 4,4'-(9-fluorenylidene)-dianiline; 2,2'-bis(trifluoromethyl)-4,4'-diaminobiphenyl; 3,3'-dichloro-4,4'-diaminodiphenylmethane; 2,2'-dichloro-4,4'-diaminobiphenyl; 2,2',5,5'-tetrachlorobenzidine; 2,2-bis(4-aminophenoxyphenyl)propane; 2,2-bis(4-aminophenyl)propane; 2,2-bis(4-aminophenyl)-1,1,1,3,3,3-hexafluoropropane; 4,4'-diaminodiphenyl ether; 3,4'-diaminodiphenyl ether; 1,3-bis(3-aminophenoxy)benzene; 1,3-bis(4-aminophenoxy)benzene; 1,4-bis(4-aminophenoxy)benzene; 4,4'-bis(4-aminophenoxy)biphenyl; 4,4'-bis(3-aminophenoxy)biphenyl; 2,2-bis[4-(4-aminophenoxy)phenyl]propane; 2,2-bis[4-(4-aminophenoxy)phenyl]-1,1,1,3,3,3-hexafluoropropane; 4,4'-diaminodiphenyl thioether; and 4,4'-diaminodiphenylsulfone.

An example of the polyetherketone includes polyaryletherketone disclosed in JP 2001-049110 A and represented by the following general formula (7).

[Chem 7]

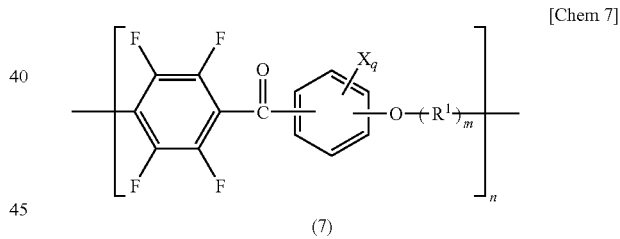

(7)

In the above formula (7), X represents a substituent, and q represents the number of the substituents. X represents a halogen atom, a lower alkyl group, a halogenated alkyl group, a lower alkoxy group, or a halogenated alkoxy group, for example. A plurality of Xs may be the same or different from each other.

Examples of the halogen atom include a fluorine atom, a bromine atom, a chlorine atom, and an iodine atom. Of those, a fluorine atom is preferred. The lower alkyl group is preferably an alkyl group having a straight chain or branched chain of 1 to 6 carbon atoms, more preferably an alkyl group having a straight chain or branched chain of 1 to 4 carbon atoms. More specifically, the lower alkyl group is preferably a methyl group, an ethyl group, a propyl group, an isopropyl group, a butyl group, an isobutyl group, a sec-butyl group, or a tert-butyl group, and particularly preferably a methyl group or an ethyl group. An example of the halogenated alkyl group includes a halide of the above lower alkyl group such as a trifluoromethyl group. The lower alkoxy group is preferably an alkoxy group having a straight chain or branched chain of 1 to 6 carbon atoms, more preferably an alkoxy group having a straight chain or branched chain of 1 to 4 carbon atoms. More specifically, the lower alkoxy group is preferably a methoxy group, an ethoxy group, a propoxy group, an isopropoxy group, a butoxy group, an isobutoxy group, a sec-butoxy group, or a tert-butoxy group, and particularly preferably a methoxy group or an ethoxy group. An example of the halogenated alkoxy group includes a halide of the above lower alkoxy group such as a trifluoromethoxy group.

In the above formula (7), q is an integer of 0 to 4. In the above formula (7), preferably, q=0, and a carbonyl group and an oxygen atom of ether bonded to both ends of a benzene ring are located in para positions.

In the above formula (7), $R^1$ is a group represented by the following formula (8), and m is an integer of 0 or 1.

[Chem 8]

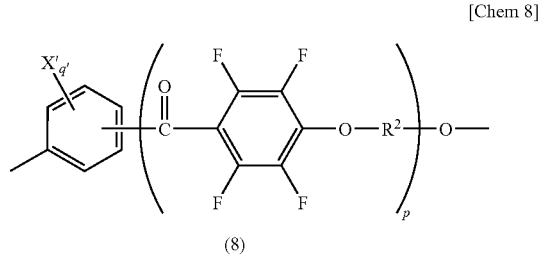

(8)

In the above formula (8), X' represents a substituent which is the same as X in the above formula (7), for example. In the above formula (8), a plurality of X's may be the same or different from each other. q' represents the number of the substituents X'. q' is an integer of 0 to 4, and q' is preferably 0. p is an integer of 0 or 1.

In the above formula (8), $R^2$ represents a divalent aromatic group. Examples of the divalent aromatic group include: an o-, m-, or p-phenylene group; and a divalent group derived from naphthalene, biphenyl, anthracene, o-, m-, or p-terphenyl, phenanthrene, dibenzofuran, biphenyl ether, or biphenyl sulfone. In the divalent aromatic group, hydrogen directly bonded to an aromatic group may be substituted with a halogen atom, a lower alkyl group, or a lower alkoxy group. Of those, $R^2$ is preferably an aromatic group selected from groups represented by the following formulae (9) to (15).

[Chem 9]

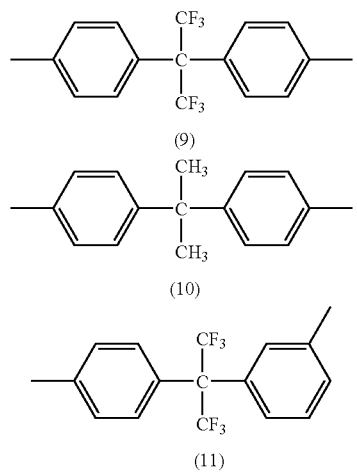

(9)

(10)

(11)

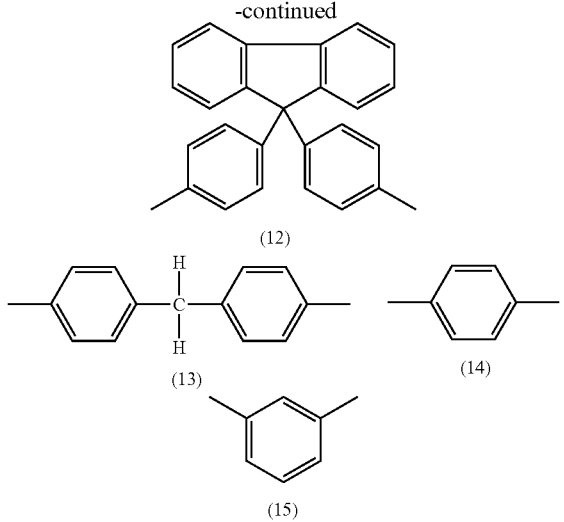

(12)

(13) (14)

(15)

In the above formula (7), $R^1$ is preferably a group represented by the following formula (16). In the following formula (16), $R^2$ and p are defined as those in the above formula (8).

[Chem 10]

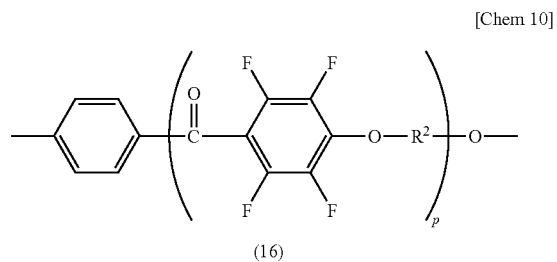

(16)

In the above formula (7), n represents a degree of polymerization. n falls within a range of 2 to 5,000, preferably within a range of 5 to 500, for example. Polymerization may involve polymerization of repeating units of the same structure or polymerization of repeating units of different structures. In the latter case, a polymerization form of the repeating units may be block polymerization or random polymerization.

Terminals of the polyaryletherketone represented by the above formula (7) are preferably a fluorine atom on a p-tetrafluorobenzoylene group side and a hydrogen atom on an oxyalkylene group side. Such polyaryletherketone can be represented by the following general formula (17), for example. In the following formula (17), n represents the same degree of polymerization as that in the above formula (7).

[Chem 11]

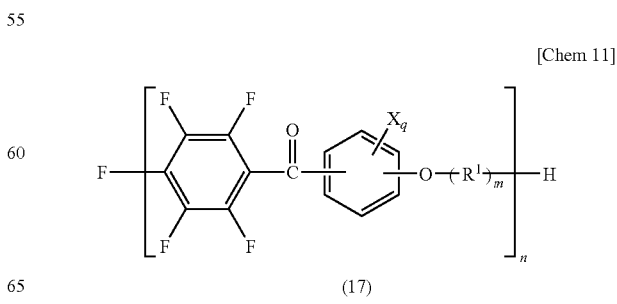

(17)

Specific examples of the polyaryletherketone represented by the above formula (7) include compounds represented by the following formulae (18) to (21). In each of the following formulae, n represents the same degree of polymerization as that in the above formula (7).

(wherein, X is a halogen or hydrogen), a CO group, an O atom, an S atom, an $SO_2$ group, an $Si(R)_2$ group, and an $N(R)$ group, for example. A plurality of Es may be the same or different from each other. In E, R is at least one of an alkyl group having 1 to 3 carbon atoms and a halogenated alkyl

[Chem 12]

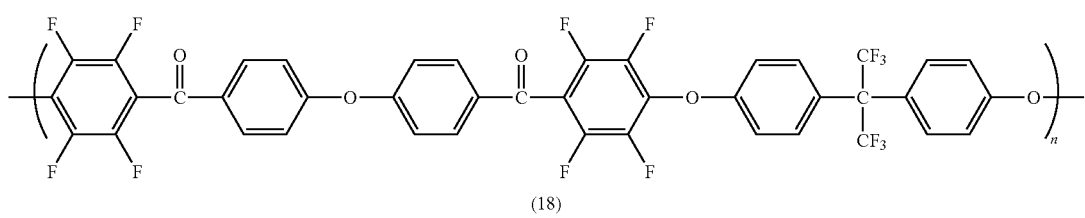

(18)

[Chem 13]

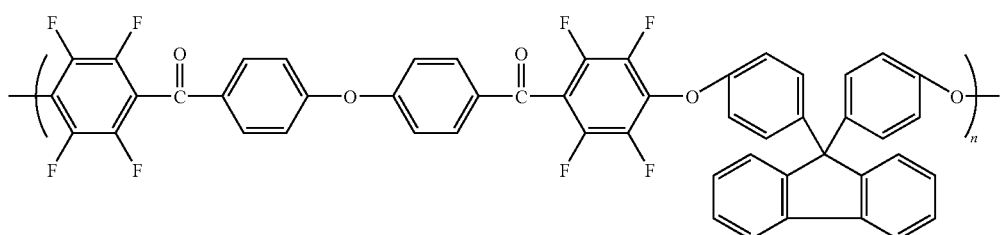

(19)

[Chem 14]

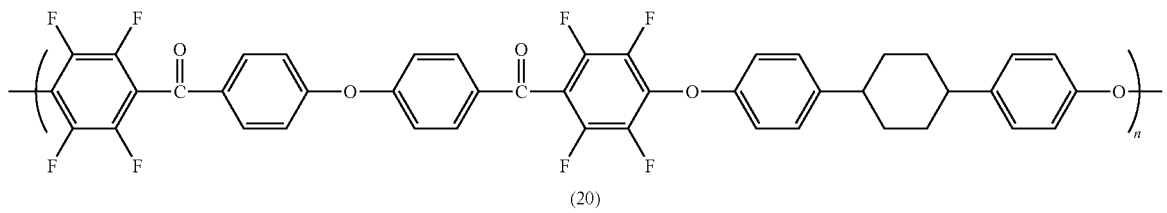

(20)

[Chem 15]

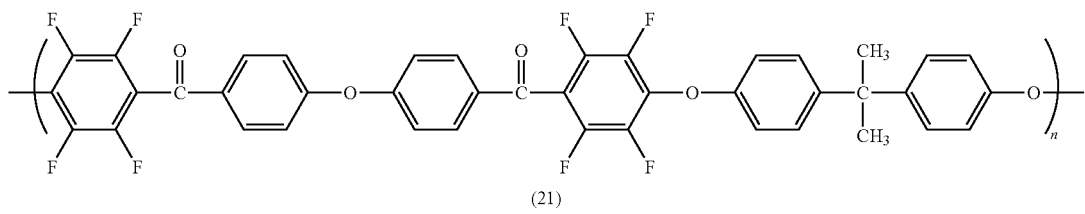

(21)

In addition, an example of polyamide or polyester includes polyamide or polyester disclosed in JP 10-508048 A. A repeating unit thereof can be represented by the following general formula (22), for example.

group having 1 to 3 carbon atoms, and is located in a meta or para position with respect to a carbonyl functional group or a Y group.

[Chem 16]

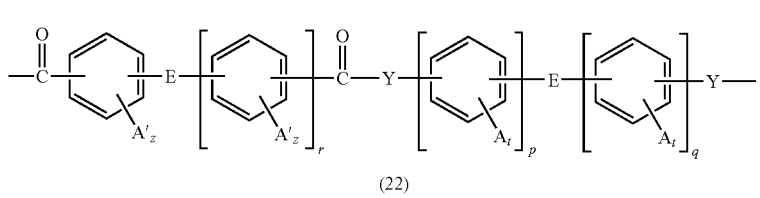

(22)

In the above formula (22), Y represents O or NH. E represents at least one selected from a covalent bond, an alkylene group having 2 carbon atoms, a halogenated alkylene group having 2 carbon atoms, a $CH_2$ group, a $C(CX_3)_2$ group In the above formula (22), A and A' each represent a substituent, and t and z represent the numbers of the respective substituents. p represents an integer of 0 to 3, and q represents an integer of 1 to 3. r represents an integer of 0 to 3.

A is selected from hydrogen, a halogen, an alkyl group having 1 to 3 carbon atoms, a halogenated alkyl group having 1 to 3 carbon atoms, an alkoxy group represented by OR (wherein, R is defined as above), an aryl group, a substituted aryl group prepared through halogenation or the like, an alkoxycarbonyl group having 1 to 9 carbon atoms, an alkylcarbonyloxy group having 1 to 9 carbon atoms, an aryloxycarbonyl group having 1 to 12 carbon atoms, an arylcarbonyloxy group having 1 to 12 carbon atoms and its substituted derivatives, an arylcarbamoyl group having 1 to 12 carbon atoms, and arylcarbonylamino group having 1 to 12 carbon atoms and its substituted derivatives, for example. A plurality of As may be the same or different from each other. A' is selected from a halogen, an alkyl group having 1 to 3 carbon atoms, a halogenated alkyl group having 1 to 3 carbon atoms, a phenyl group, and a substituted phenyl group, for example. A plurality of A's may be the same or different from each other. Examples of the substituent on a phenyl ring of the substituted phenyl group include a halogen, an alkyl group having 1 to 3 carbon atoms, a halogenated alkyl group having 1 to 3 carbon atoms, and the combination thereof. t represents an integer of 0 to 4, and z represents an integer of 0 to 3.

The repeating unit of the polyamide or polyester represented by the above formula (22) is preferably a repeating unit represented by the following general formula (23).

[Chem 17]

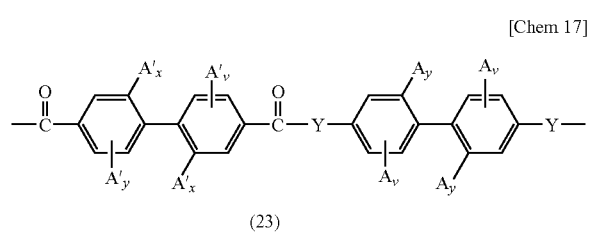

(23)

In the above formula (23), A, A', and Y are defined as those in the above formula (22). v represents an integer of 0 to 3, preferably an integer of 0 to 2. x and y are each 0 or 1, but are not both 0.

Next, a typical method for producing the above-mentioned second optical compensation layer will be described. As the method for producing the second optical compensation layer, any appropriate method can be adopted as long as the effects of the present invention are exhibited.

The second optical compensation layer is preferably formed by applying a solution of at least one kind of polymer selected from the group consisting of polyamide, polyimide, polyester, polyether ketone, polyamideimide, and polyesteramide onto a transparent polymer film, drying the solution to form the polymer layer on the transparent polymer film, and stretching or contracting the transparent polymer film and the polymer layer integrally.

Examples of the solvent for the application solution (a polymer solution to apply on a transparent polymer film) include but are not limited to: halogenated hydrocarbons such as chloroform, dichloromethane, carbon tetrachloride, dichloroethane, tetrachloroethane, trichloroethylene, tetrachloroethylene, chlorobenzene, and orthodichlorobenzene; phenols such as phenol and parachloro phenol; aromatic hydrocarbons such as benzene, toluene, xylene, methoxybenzene, and 1,2-dimethoxybenzene; ketone-based solvents such as acetone, methyl ethyl ketone, methyl isobutyl ketone, cyclohexanone, cyclopentanone, 2-pyrrolidone, and N-methyl-2-pyrrolidone; ester-based solvents such as ethyl acetate and butyl acetate; alcohol-based solvents such as t-butyl alcohol, glycerin, ethylene glycol, triethylene glycol, ethylene glycol monomethyl ether, diethylene glycol dimethyl ether, propylene glycol, dipropylene glycol, and 2-methyl-2,4-pentanediol; amide-based solvents such as dimethylformamide and dimethylacetamide; nitrile-based solvents such as acetonitrile and butyronitrile; ether-based solvents such as diethyl ether, dibutyl ether, and tetrahydrofuran; and carbon disulfide, ethyl cellosolve, and butyl cellosolve. Of those, methylisobutyl ketone is preferred. This is because methylisobutyl ketone exhibits high solubility with respect to a non-liquid crystal material, and does not erode a substrate. These solvents can be used alone or in combination of at least two kinds.

As the concentration of the above-mentioned non-liquid crystalline polymer in the above-mentioned application solution, any appropriate concentration can be adopted as long as the above-mentioned optical compensation layer is obtained and applying can be performed. For example, the solution contains a non-liquid crystalline polymer in an amount of preferably 5 to 50 parts by weight, and more preferably 10 to 40 parts by weight with respect to 100 parts by weight of the solvent. The solution in such a concentration range has viscosity that makes applying easier.

The above-mentioned application solution can further contain various additives such as a stabilizer, a plasticizer, and metals, if required.

The above-mentioned application solution can further contain other different resins, if required. Examples of such other resins include various kinds of general-purpose resins, engineering plastic, a thermoplastic resin, and a thermosetting resin. By using such resins together, an optical compensation layer having mechanical strength and durability suitable depending upon the purpose can be formed.

Examples of the above-mentioned general-purpose resins include polyethylene (PE), polypropylene (PP), polystyrene (PS), polymethyl metharylate (PMMA), ABS resin, and AS resin. Examples of the above-mentioned engineering plastic include polyacetal (POM), polycarbonate (PC), polyamide (PA: nylon), polyethylene terephthalate (PET), and polybutylene terephthalate (PBT). Examples of the above-mentioned thermoplastic resin include polyphenylene sulfide (PPS), polyethersulfone (PES), polyketone (PK), polyimide (PI), polycyclohexanedimethanol terephthalate (PCT), polyarylate (PAR), and liquid crystal polymer (LCP). Examples of the above-mentioned thermosetting resin include epoxy resin and phenol novolac resin.

The kind and amount of the above-mentioned different resins added to the above-mentioned application solution can be set appropriately depending upon the purpose. For example, such resin can be added to the above-mentioned non-liquid crystalline polymer in an amount of preferably 0 to 50% by weight, and more preferably 0 to 30% by weight.

Examples of the applying methods for the solution include, but are not limited to spin coating, roll coating, flow coating, printing, dip coating, flow casting, bar coating, and gravure printing. Further, as required, a method of superimposing a polymer layer may also be employed when applying.

After applying the solution, for example, a solvent in the above-mentioned solution is evaporated to be removed by drying such as natural drying, air drying, heat drying (e.g., 60 to 250° C.), etc., whereby a film-shaped optical compensation layer is formed.

As the above-mentioned transparent polymer film, a film similar to that of a protective layer described later (in B-4) can be used.

The second optical compensation layer may be used by peeling the second optical compensation layer from the laminate obtained as described above (laminate in which the second optical compensation layer is formed on the transparent polymer film), or may be used as the laminate. In the case of further laminating polarizers with use of the laminate as it is, the transparent polymer film in the laminate may function as a protective film of the polarizers described later.

B-3. Polarizer

Any suitable polarizers may be employed as the first polarizer and the second polarizer depending on the purpose. Examples of the polarizer include: a film prepared by adsorbing a dichromatic substance such as iodine or a dichromatic dye on a hydrophilic polymer film such as a polyvinyl alcohol-based film, a partially formalized polyvinyl alcohol-based film, or an ethylene/vinyl acetate copolymer-based partially saponified film and uniaxially stretching the film; and a polyene-based orientated film such as a dehydrated product of a polyvinyl alcohol-based film or a dichlorinated product of a polyvinyl chloride-based film. Of those, a polarizer prepared by adsorbing a dichromatic substance such as iodine on a polyvinyl alcohol-based film and uniaxially stretching the film is particularly preferred in view of high polarized dichromaticity. A thickness of the polarizer is not particularly limited, but is generally about 5 to 80 μm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like as required, or the polyvinyl alcohol-based film may be immersed in an aqueous solution of potassium iodide or the like. Further, the polyvinyl alcohol-based film may be immersed and washed in water before coloring as required. Washing the polyvinyl alcohol-based film with water not only allows removal of contamination on a film surface or washing away of an antiblocking agent, but also prevents nonuniformity such as uneven coloring or the like by swelling the polyvinyl alcohol-based film. The stretching of the film may be carried out after coloring of the film with iodine, carried out during coloring of the film, or carried out followed by coloring of the film with iodine. The stretching may be carried out in an aqueous solution of boric acid or potassium iodide, or in a water bath.

B-4. Protective Layer

A protective layer 50 is preferably transparent and colorless. The in-plane retardation $\Delta nd(550)$ of the protective layer 50 is preferably 0 nm or more and 10 nm or less, and more preferably 0 nm or more and 8 nm or less. The thickness direction retardation $Rth(550)$ of the protective layer 50 is preferably 10 nm or more and 80 nm or less, more preferably 40 nm or more and 80 nm or less, and most preferably 45 nm or more and 70 nm or less.

The thickness of the protective layer 50 may appropriately be set in accordance with the purpose. Specifically, the thickness is preferably 20 to 140 μm, more preferably 40 to 120 μm, and most preferably 60 to 100 μm.

A material used for forming the protective layer 50 may employ any appropriate material. An example of the material is a plastic film having excellent transparency, mechanical strength, heat stability, moisture barrier properties, and the like. Specific examples of a resin used for forming the plastic film include an acetate resin such as triacetyl cellulose (TAC), a polyester resin, a polyether sulfone resin, a polysulfone resin, a polycarbonate resin, a polyamide resin, a polyimide resin, a polyolefin resin, an acrylic resin, a polynorbornene resin, a cellulose resin, a polyallylate resin, a polystyrene resin, a polyvinyl alcohol resin, a polyacrylic resin, and a mixture thereof. Further, thermosetting resin or UV-curable resin such as an acrylic, an urethane-based, an acryl urethane-based, an epoxy-based, a silicone-based may also be used. From viewpoints of polarization properties and durability, a TAC film having a surface subjected to saponification treatment with an alkali or the like is preferred.

Further, for example, a polymer film formed of a resin composition as described in JP 2001-343529 A (WO 01/37007) can also be used as a transparent protective layer. More specifically, the polymer film is from a mixture of a thermoplastic resin having a substituted imide group or a non-substituted imide group on a side chain and a thermoplastic resin having a substituted phenyl group or a non-substituted phenyl group and a cyano group on a side chain. A specific example includes a resin composition having an alternating copolymer made of isobutene and N-methylenemaleimide and a copolymer of acrylonitrile and styrene. For example, an extruded product of such a resin composition can be used.

As described above, the liquid crystal panel of the present invention can have a protective film other than the above-mentioned protective layer. As the protective film, a film similar to the protective layer can be used.

The above-mentioned respective layers (films) are laminated via any appropriate pressure-sensitive adhesive layer or adhesive layer.

Hereinafter, the present invention will be described specifically by way of examples, however the present invention is not limited thereto. The methods for measuring respective characteristics in the examples are as follows.

(1) Measurement of a Retardation

The refractive indices $nx$, $ny$, and $nz$ of a sample film were measured with a spectroscopic ellipsometer (M-220, manufactured by JASCO Corporation), whereby the in-plane retardation $\Delta nd$ and the thickness direction retardation $Rth$ were calculated. The measurement temperature was 23° C., and the measurement wavelength was 380 nm, 550 nm, and 780 nm.

(2) Measurement of an Photoelastic Coefficient

The photoelastic coefficient of a sample film was measured with the spectroscopic ellipsometer (M-220, manufactured by JASCO Corporation).

(3) Measurement of a Color Shift

The color tone of a liquid crystal display apparatus was measured by changing a polar angle in a range of 0° to 80° in an azimuth angle of 45°, using "EZ Contrast 160D" (trade name, manufactured by ELDIM), and plotted on an XY chromaticity diagram. Further, the color tone of the liquid crystal display apparatus was measured by changing the azimuth angle in a range of 0° to 360° in a polar angle of 60°.

(4) Measurement of a Contrast

A white image and a black image were displayed on the liquid crystal display apparatus, whereby the contrast was measured by "EZ Contrast 160D" (Trade name, manufactured by ELDIM).

EXAMPLE 1

(Formation of a First Optical Compensation Layer)

A film of a cellulose ester with a thickness of 70 μm (manufactured by Kaneka Corporation, trade name: KA, DSac (acetyl substitution degree)=0.04, DSpr (propionyl substitution degree)=2.76) was stretched at a free end to a 1.5 times length of the original length at 145° C. to obtain a first optical compensation layer with a thickness of 68 μm. The photoelastic coefficient of the obtained first compensating layer was $25 \times 10^{-12}$ (m$^2$/N). The in-plane retardation of the obtained first optical compensation layer was Δnd(380)=65 nm, Δnd(550)=90 nm, Δnd(780)=105 nm. The thickness direction retardation Rth(380)=69 nm, Rth(550)=95 nm, Rth(780)=111 nm. The refractive index profile of 550 nm was nx>ny≈nz.

(Production of a Polarizing Plate with a First Optical Compensation Layer)

The first optical compensation layer obtained in the above was attached to a polarizing plate (manufactured by Nitto Denko Corporation, trade name: SEG1224) having a configuration: TAC protective film (TF80UL (Trade Name), manufactured by Fuji Photo Film Co., Ltd.)/polarizer/TAC protective film (TF80UL (Trade Name)) via a pressure-sensitive adhesive (thickness: 20 μm), whereby a polarizing plate with a first optical compensation layer was obtained. At this time, the first optical compensation layer was laminated on the polarizing plate so that a slow axis of the first optical compensation layer and a stretching axis (absorption axis) of a polarizer were substantially perpendicular to each other. Further, the in-plane retardation of the TAC protective film (TF80UL (Trade Name)) was Δnd(550)=1 nm, and the thickness direction retardation was Rth(550)=60 nm.

(Formation of a Second Optical Compensation Layer)

Polyimide synthesized from 2,2-bis(3,4-dicarboxyphenyl)hexafluoropropane dianhydride (6FDA) and 2,2'-bis(trifluoromethyl)-4,41-diaminobiphenyl (TFMB) was dissolved in methyl isobutyl ketone (MIBK), to thereby prepare a 15 weight % polyimide solution. This solution was applied to a triacetyl cellulose substrate (transparent polymer film) to a thickness of 30 μm. Then, the whole was subjected to drying treatment at 100° C. for 10 minutes, to thereby obtain a second optical compensation layer having a thickness of about 4 μm. The obtained second optical compensation layer had in-plane retardations Δnd(380) of 0.4 nm, Δnd(550) of 0.3 nm, and Δnd(780) of 0.3 nm and thickness direction retardations Rth(380) of 178 nm, Rth(550) of 120 nm, and Rth(780) of 110 nm. The obtained second optical compensation layer had a refractive index profile of nx≈ny>nz at 550 nm.

(Production of a Polarizing Plate with a Second Optical Compensation Layer)

The second optical compensation layer obtained in the above was attached to a polarizing plate (manufactured by Nitto Denko Corporation, trade name: SEG1224) via a pressure-sensitive adhesive (thickness: 20 μm) to obtain a polarizing plate with a second optical compensation layer.

(Production of a Liquid Crystal Panel)

Figure 5A:
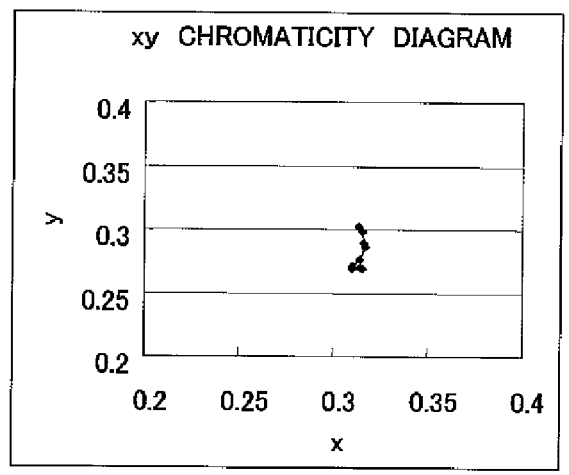
[FIG. 5] Parts (a) and (b) are measurement results of a color shift of a liquid crystal panel of Example 1 according to the present invention, and part (c) is a radar chart showing viewing angle dependence of a contrast of the liquid crystal panel of Example 1 according to the present invention.
Figure 5B:
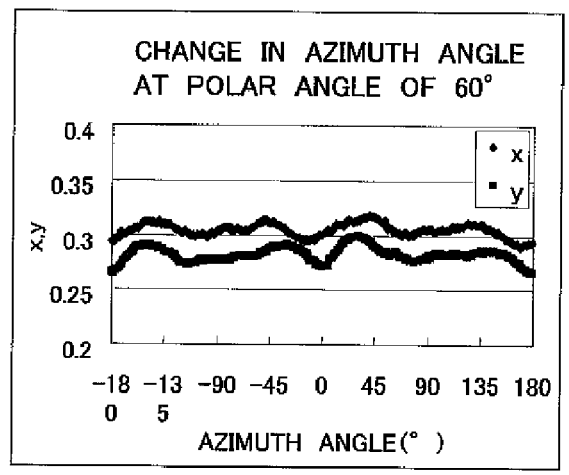
Figure 5C:
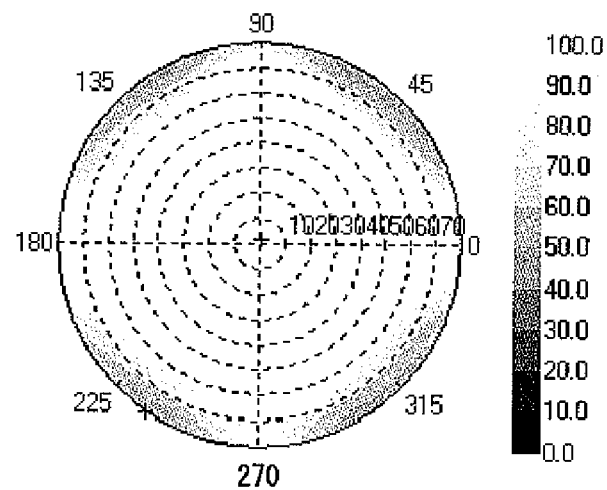

A liquid crystal cell was removed from a 32-inch liquid crystal TV (with a VA-mode liquid crystal cell mounted) of HappyWEGA manufactured by Sony Corporation, and the above-mentioned polarizing plate with a first optical compensation layer was attached on the viewer side of the liquid crystal cell via an adhesive (thickness: 20 μm). At this time, the polarizing plate was attached so that the first optical compensation layer was placed on the liquid crystal cell side. On the backlight side of the liquid crystal cell, the above-mentioned polarizing plate with a second optical compensation layer was attached via an adhesive (thickness: 20 μm). At this time, the polarizing plate was attached so that the second optical compensation layer was placed on the liquid crystal cell side. Further, the polarizing plates were laminated so that a stretching (absorption) axis of a polarizer of the polarizing plate with a first optical compensation layer and a stretching (absorption) axis of a polarizer of the polarizing plate with a second optical compensation layer are substantially perpendicular to each other, whereby a liquid crystal panel was obtained. The measurement results of a color shift obtained by changing a polar angle in a range of 0° to 80° in a direction of an azimuth angle of 45° in the liquid crystal display apparatus produced using the obtained liquid crystal panel are shown in FIG. 5(a), and the measurement results of a color shift obtained by changing an azimuth angle in a range of 0° to 360° in a direction of a polar angle of 60° are shown in FIG. 5(b). Further, the viewing angle dependence of a contrast is shown in a radar chart of FIG. 5(c).

EXAMPLE 2

(Formation of a First Optical Compensation Layer)

A cellulose ester film (KA (trade name) manufactured by Kaneka Corporation) having a thickness of 70 μm was stretched at a free end to a 1.45 times length of the original length at 145° C., to thereby obtain a first optical compensation layer. The obtained first optical compensation layer had a photoelastic coefficient of $25 \times 10^{-12}$ (m$^2$/N). The obtained first optical compensation layer had in-plane retardations Δnd(380) of 58 nm, Δnd(550) of 80 nm, and Δnd(780) of 93 nm and thickness direction retardations Rth(380) of 65 nm, Rth(550) of 90 nm, and Rth(780) of 105 nm. The obtained first optical compensation layer had a refractive index profile of nx>ny≈nz at 550 nm.

(Formation of a Second Optical Compensation Layer)

Polyimide synthesized from 2,2-bis(3,4-dicarboxyphenyl)hexafluoropropane dianhydride (6FDA) and 2,2'-bis(trifluoromethyl)-4,4'-diaminobiphenyl (TFMB) was dissolved in methyl isobutyl ketone (MIBK), to thereby prepare a 15 weight % polyimide solution. This solution was applied to a triacetyl cellulose substrate (transparent polymer film) to a thickness of 30 μm. Then, the whole was subjected to drying treatment at 100° C. for 10 minutes, to thereby obtain a second optical compensation layer having a thickness of about 5 μm. The obtained second optical compensation layer had in-plane retardations Δnd(380) of 0.3 nm, Δnd(550) of 0.2 nm, and Δnd(780) of 0.2 nm and thickness direction retardations Rth(380) of 208 nm, Rth(550) of 140 nm, and Rth(780) of 129 nm. The obtained second optical compensation layer had a refractive index profile of nx≈ny>nz at 550 nm.

Figure 6A:
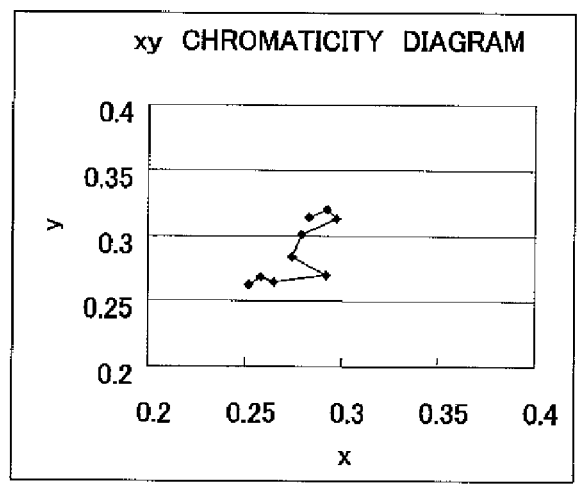
[FIG. 6] Parts (a) and (b) are measurement results of a color shift of a liquid crystal panel of Example 2 according to the present invention, and part (c) is a radar chart showing viewing angle dependence of a contrast of the liquid crystal panel of Example 2 according to the present invention.
Figure 6B:
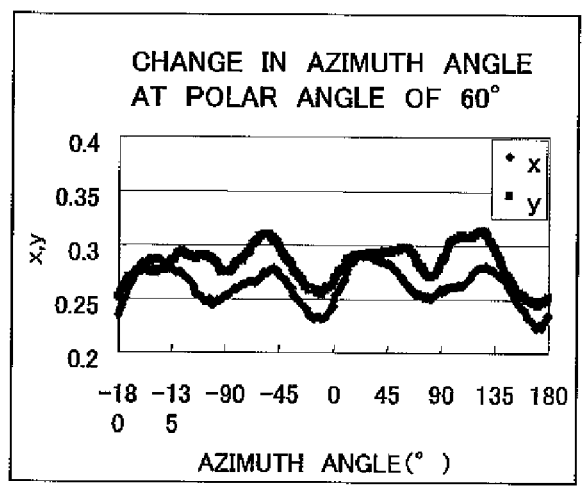
Figure 6C:
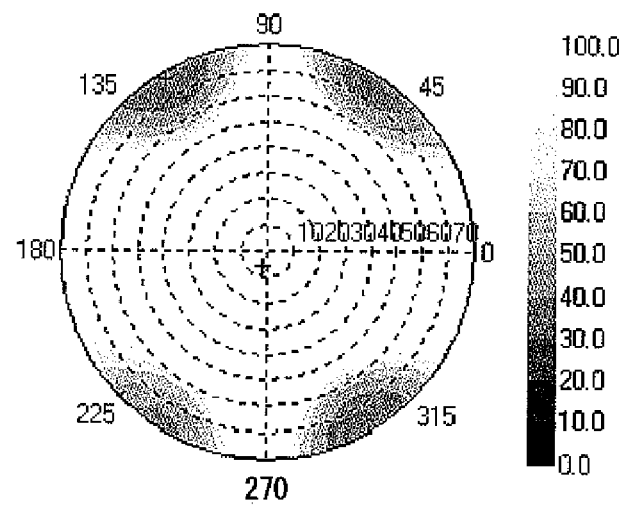

A liquid crystal panel was obtained in the same way as in Example 1, except for using the first optical compensation layer and the second optical compensation layer obtained in the above. The measurement results of a color shift obtained by changing a polar angle in a range of 0° to 80° in a direction of an azimuth angle of 45° in the liquid crystal display apparatus produced using the obtained liquid crystal panel are shown in FIG. 6(a), and the measurement results of a color shift obtained by changing an azimuth angle in a range of 0° to 360° in a direction of a polar angle of 60° are shown in FIG. 6(b). Further, the viewing angle dependence of a contrast is shown in a radar chart of FIG. 6(c).

EXAMPLE 3

(Formation of a First Optical Compensation Layer)

A cellulose ester film (KA (trade name) manufactured by Kaneka Corporation) having a thickness of 70 μm was stretched at a free end to a 1.55 times length of the original length at 145° C., to thereby obtain a first optical compensation layer. The obtained first optical compensation layer had a photoelastic coefficient of $25 \times 10^{12}$ (m²/N). The obtained first optical compensation layer had in-plane retardations Δnd (380) of 73 nm, Δnd(550) of 100 nm, and Δnd(780) of 117 nm and thickness direction retardations Rth(380) of 76 nm, Rth (550) of 105 nm, and Rth(780) of 123 nm. The obtained first optical compensation layer had a refractive index profile of nx>ny≈nz at 550 nm.

(Formation of a Second Optical Compensation Layer)

Polyimide synthesized from 2,2-bis(3,4-dicarboxyphenyl) hexafluoropropane dianhydride (6FDA) and 2,2'-bis(trifluoromethyl)-4,4'-diaminobiphenyl (TFMB) was dissolved in methyl isobutyl ketone (MIBK), to thereby prepare a 15 weight % polyimide solution. This solution was applied to a triacetyl cellulose substrate (transparent polymer film) to a thickness of 30 μm. Then, the whole was subjected to drying treatment at 100° C. for 10 minutes, to thereby obtain a second optical compensation layer having a thickness of about 4 μm. The obtained second optical compensation layer had in-plane retardations Δnd(380) of 0.3 nm, Δnd(550) of 0.2 nm, and Δnd(780) of 0.2 nm and thickness direction retardations Rth(380) of 164 nm, Rth(550) of 110 nm, and Rth (780) of 101 nm. The obtained second optical compensation layer had a refractive index profile of nx≈ny>nz at 550 nm.

Figure 7A:
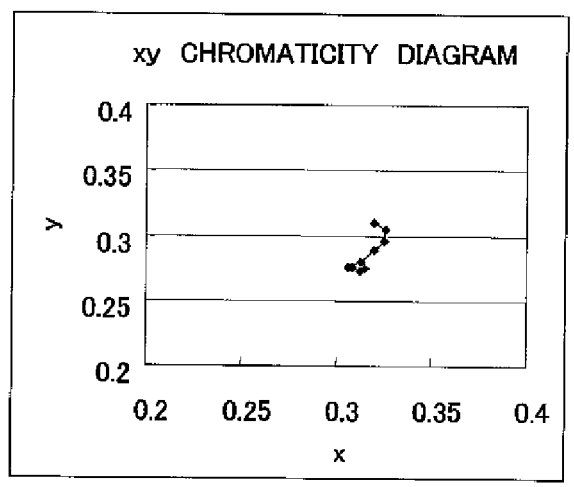
[FIG. 7] Parts (a) and (b) are measurement results of a color shift of a liquid crystal panel of Example 3 according to the present invention, and part (c) is a radar chart showing viewing angle dependence of a contrast of a liquid crystal panel of Example 3 according to the present invention.
Figure 7B:
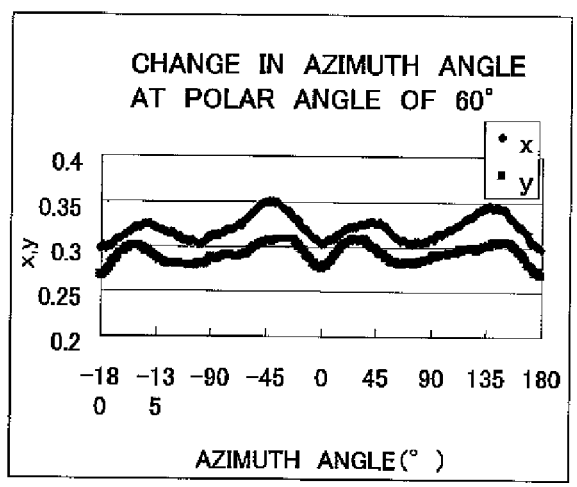
Figure 7C:
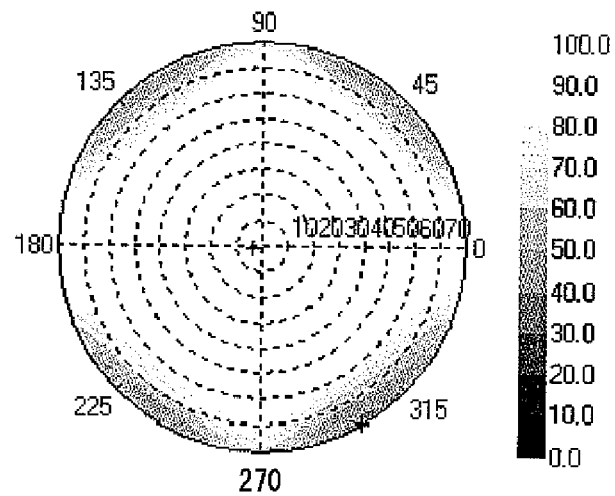

A liquid crystal panel was obtained in the same way as in Example 1, except for using the first optical compensation layer and the second optical compensation layer obtained in the above. The measurement results of a color shift obtained by changing a polar angle in a range of 0° to 80° in a direction of an azimuth angle of 45° in the liquid crystal display apparatus produced using the obtained liquid crystal panel are shown in FIG. 7(a), and the measurement results of a color shift obtained by changing an azimuth angle in a range of 0° to 360° in a direction of a polar angle of 60° are shown in FIG. 7(b). Further, the viewing angle dependence of a contrast is shown in a radar chart of FIG. 7(c).

EXAMPLE 4

(Formation of a First Optical Compensation Layer)

A cellulose ester film (KA (trade name) manufactured by Kaneka Corporation) having a thickness of 70 μm was stretched at a free end to a 1.5 times length of the original length at 150° C., to thereby obtain a first optical compensation layer. The obtained first optical compensation layer had a photoelastic coefficient of $25 \times 10^{-12}$ (m²/N). The obtained first optical compensation layer had in-plane retardations Δnd (380) of 65 nm, Δnd(550) of 90 nm, and Δnd(780) of 105 nm and thickness direction retardations Rth(380) of 80 nm, Rth (550) of 110 nm, and Rth(780) of 128 nm. The obtained first optical compensation layer had a refractive index profile of nx>ny>nz at 550 nm.

(Formation of a Second Optical Compensation Layer)

Polyimide synthesized from 2,2-bis(3,4-dicarboxyphenyl) hexafluoropropane dianhydride (6FDA) and 2,2'-bis(trifluoromethyl)-4,4'-diaminobiphenyl (TFMB) was dissolved in methyl isobutyl ketone (MIBK), to thereby prepare a 15 weight % polyimide solution. This solution was applied to a triacetyl cellulose substrate (transparent polymer film) to a thickness of 25 μm. Then, the whole was subjected to drying treatment at 100° C. for 10 minutes, to thereby obtain a second optical compensation layer having a thickness of about 3.5 μm. The obtained second optical compensation layer had in-plane retardations Δnd (380) of 0.4 nm, Δnd(550) of 0.3 nm, and Δnd(780) of 0.3 nm and thickness direction retardations Rth(380) of 149 nm, Rth(550) of 100 nm, and Rth(780) of 92 nm. The obtained second optical compensation layer had a refractive index profile of nx≈ny>nz at 550 nm.

(Production of a Polarizing Plate with a First Optical Compensation Layer)

The first optical compensation layer obtained in the above was attached to a polarizing plate (manufactured by Nitto Denko Corporation, trade name: SEG1224) via a pressure-sensitive adhesive (thickness: 20 μm). At this time, the first optical compensation layer was laminated on the polarizing plate so that a slow axis of the first optical compensation layer and a stretching (absorption) axis of a polarizer were substantially perpendicular to each other. Then, the second optical compensation layer obtained in the above was attached to the first optical compensation layer via a pressure-sensitive adhesive (thickness: 20 μm), whereby a polarizing plate with a first optical compensation layer was obtained.

(Production of a Liquid Crystal Panel)

Figure 8A:
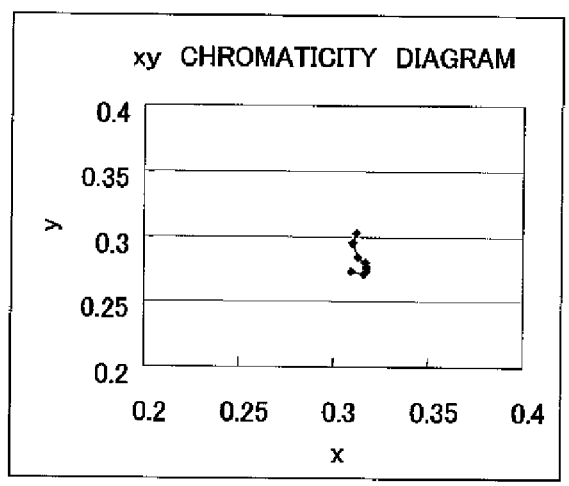
[FIG. 8] Parts (a) and (b) are measurement results of a color shift of a liquid crystal panel of Example 4 according to the present invention, and part (c) is a radar chart showing viewing angle dependence of a contrast of a liquid crystal panel of Example 4 according to the present invention.
Figure 8B:
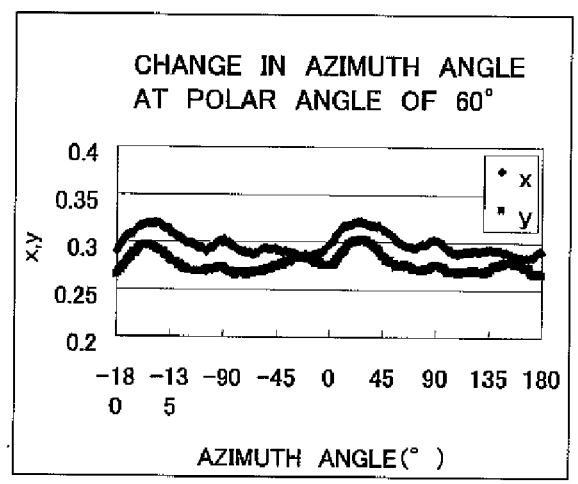
Figure 8C:
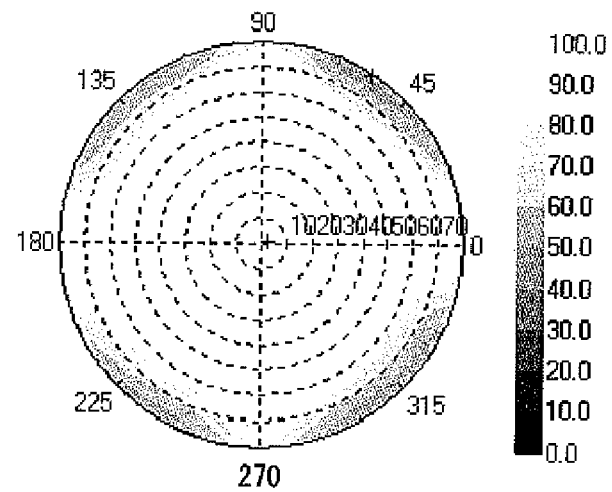

The above-mentioned polarizing plate with a first optical compensation layer was attached to a viewer side of a liquid crystal cell similar to that used in Example 1 via an adhesive (thickness: 20 μm). At this time, the polarizing plate was attached to the liquid crystal cell so that the second optical compensation layer was placed on the liquid crystal cell side. On the backlight side of the liquid crystal cell, a polarizing plate (manufactured by Nitto Denko Corporation, trade name: SEG1224) was attached via an adhesive (thickness: 20 μm). Further, the polarizing plates were laminated so that a stretching (absorption) axis of a polarizer of the polarizing plate with a first optical compensation layer and a stretching (absorption) axis of a polarizer of the polarizing plate were substantially perpendicular to each other, whereby a liquid crystal panel was obtained. The measurement results of a color shift obtained by changing a polar angle in a range of 0° to 80° in a direction of an azimuth angle of 45° in the liquid crystal display apparatus produced using the obtained liquid crystal panel are shown in FIG. 8(a), and the measurement results of a color shift obtained by changing an azimuth angle in a range of 0° to 360° in a direction of a polar angle of 60° are shown in FIG. 8(b). Further, the viewing angle dependence of a contrast is shown in a radar chart of FIG. 8(c).

EXAMPLE 5

(Formation of a First Optical Compensation Layer)

A cellulose ester film (KA (trade name) manufactured by Kaneka Corporation) having a thickness of 110 μm was stretched at a free end to a 1.5 times length of the original length at 150° C., to thereby obtain a first optical compensation layer. The obtained first optical compensation layer had a photoelastic coefficient of $25 \times 10^{-12}$ (m²N). The obtained first optical compensation layer had in-plane retardations Δnd (380) of 94 nm r Δnd(550) of 130 nm, and Δnd(780) of 152 nm and thickness direction retardations Rth(380) of 105 nm, Rth(550) of 145 nm, and Rth(780) of 169 nm. The obtained first optical compensation layer had a refractive index profile of nx>ny>nz at 550 nm.

(Production of a Polarizing Plate with a First Optical Compensation Layer)

A polyvinyl alcohol-based film was dyed in an aqueous solution containing iodine, and thereafter, was uniaxially stretched to 6 times length of the original length between rolls having different speeds in an aqueous solution containing boric acid, whereby a polarizer was obtained. On one side of the polarizer thus obtained, the first optical compensation layer was attached via an adhesive (thickness: 0.1 μm). At this time, the first optical compensation layer was laminated on the polarizer so that a slow axis of the first optical compensation layer and a stretching (absorption) axis of the polarizer are substantially perpendicular to each other. Further, on the other side of the polarizer, a commercially available TAC protective film (thickness: 80 μm) (manufactured by Fuji Photo Film Co., Ltd., trade name: TF80UL) was attached via a polyvinyl alcohol adhesive (thickness: 0.1 μm), whereby a polarizing plate with a first optical compensation layer was obtained.

(Formation of a Second Optical Compensation Layer)

Polyimide synthesized from 2,2-bis(3,4-dicarboxyphenyl) hexafluoropropane dianhydride (6FDA) and 2,2'-bis(trifluoromethyl)-4,4'-diaminobiphenyl (TFMB) was dissolved in methyl isobutyl ketone (MIBK), to thereby prepare a 15 weight % of polyimide solution. This solution was applied to a triacetyl cellulose substrate (transparent polymer film) to a thickness of 30 μm. Then, the whole was subjected to drying treatment at 100° C. for 10 minutes, to thereby obtain a second optical compensation layer having a thickness of about 4.2 μm. The obtained second optical compensation layer had in-plane retardations Δnd (380) of 0.3 nm, Δnd(550) of 0.3 nm, and Δnd(780) of 0.2 nm and thickness direction retardations Rth(380) of 208 nm, Rth(550) of 140 nm, and Rth(780) of 129 nm. The obtained second optical compensation layer had a refractive index profile of nx≈ny>nz at 550 nm.

Figure 9A:
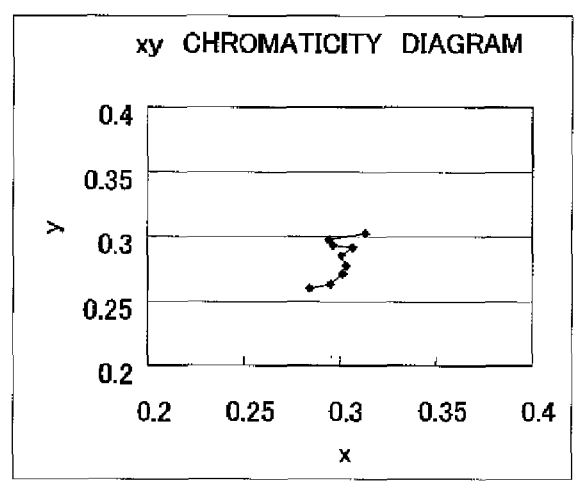
[FIG. 9] Parts (a) and (b) are measurement results of a color shift of a liquid crystal panel of Example 5 according to the present invention, and part (c) is a radar chart showing viewing angle dependence of a contrast of a liquid crystal panel of Example 5 according to the present invention.
Figure 9B:
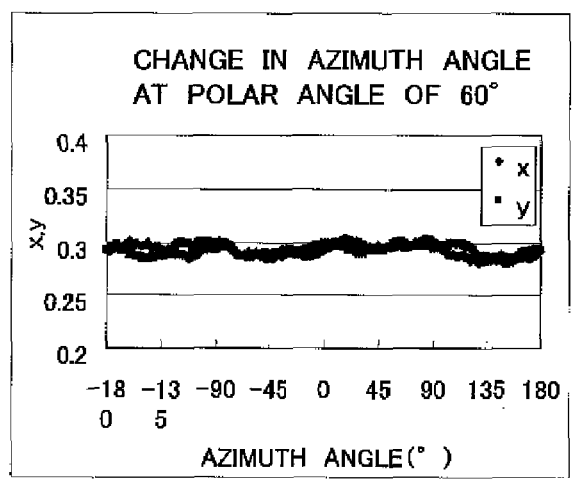
Figure 9C:
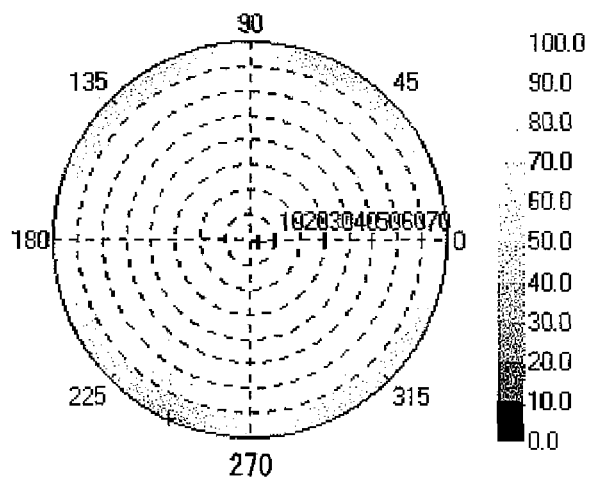

A liquid crystal panel was obtained in the same way as in Example 1, except for using the polarizing plate with a first optical compensation layer and the second optical compensation layer obtained in the above. The measurement results of a color shift obtained by changing a polar angle in a range of 0° to 80° in a direction of an azimuth angle of 45° in the liquid crystal display apparatus produced using the obtained liquid crystal panel are shown in FIG. 9(a), and the measurement results of a color shift obtained by changing an azimuth angle in a range of 0° to 360° in a direction of a polar angle of 60° are shown in FIG. 9(b). Further, the viewing angle dependence of a contrast is shown in a radar chart of FIG. 9(c).

COMPARATIVE EXAMPLE 1

Figure 10A:
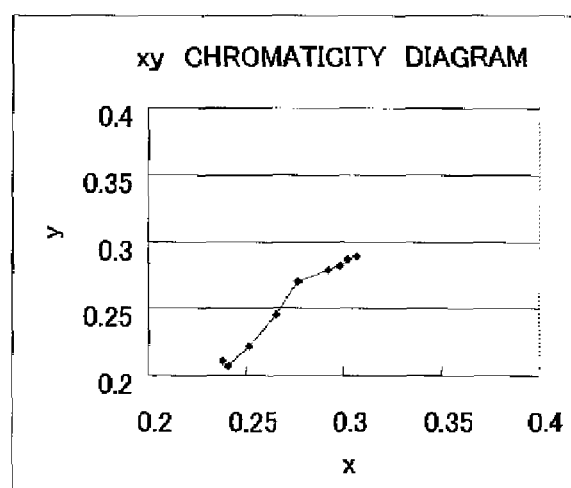
[FIG. 10] Parts (a) and (b) are measurement results of a color shift of a liquid crystal panel of Comparative Example 1, and part (c) is a radar chart showing viewing angle dependence of a contrast of a liquid crystal panel of Comparative Example 1.
Figure 10B:
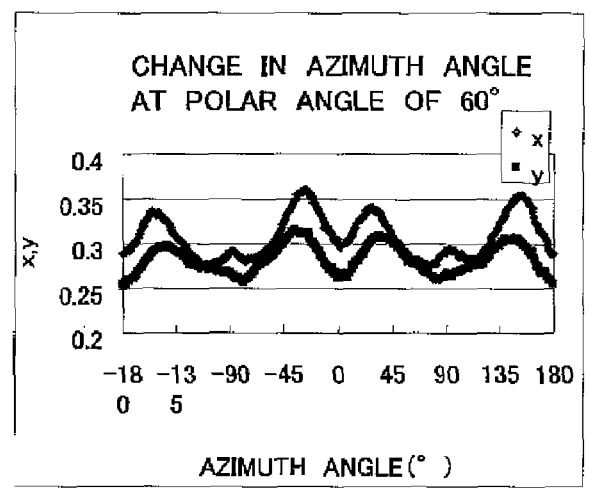
Figure 10C:
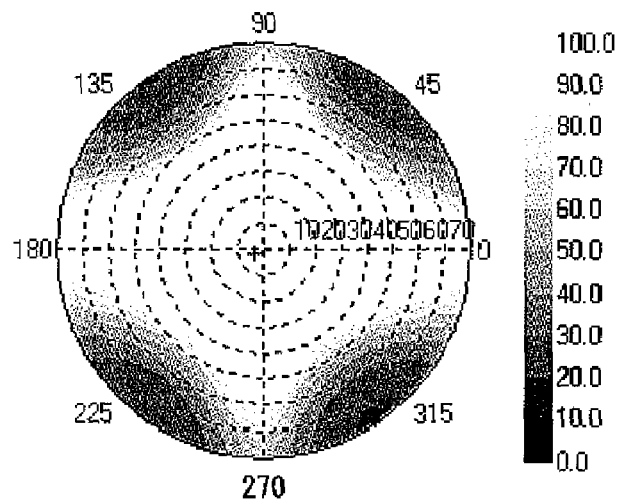

A liquid crystal panel was obtained in the same way as in Example 1, except that, in the formation of a second optical compensation layer, a polyimide solution was applied to a triacetylcellulose base, dried at 100° C. for 10 minutes, and stretched to 1.2 times length of the original length at 155° C. to form a second optical compensation layer, and a first optical compensation layer was not used. The refractive index profile of 550 nm of the obtained second optical compensation layer was nx>ny>nz. The measurement results of a color shift obtained by changing a polar angle in a range of 0° to 80° in a direction of an azimuth angle of 45° in the liquid crystal display apparatus produced using the obtained liquid crystal panel are shown in FIG. 10(a), and the measurement results of a color shift obtained by changing an azimuth angle in a range of 0° to 360° in a direction of a polar angle of 60° are shown in FIG. 10(b). Further, the viewing angle dependence of a contrast is shown in a radar chart of FIG. 10(c).

COMPARATIVE EXAMPLE 2

A norbornene-based resin film (manufactured by Zeon Corporation, trade name: ZEONOR ZF14-100) was stretched to 1.25 times length of the original length in an X-axis direction and stretched to 1.03 times length of the original length in a Y-axis direction at 135° C., and used as a second optical compensation layer. The in-plane retardation of the obtained second optical compensation layer was Δnd(380)=75 nm, Δnd(550)=68 nm, Δnd(780)=67 nm. The thickness direction retardation was Rth(380)=188 nm, Rth(550)=170 nm, Rth (780)=168 nm. The refractive index profile of 550 nm was nx>ny>nz. The obtained second optical compensation layer was attached to a polarizing plate (manufactured by Nitto Denko Corporation, trade name: SEG1224) via a pressure-sensitive adhesive (thickness: 20 μm), whereby a polarizing plate with a second optical compensation layer was obtained.

Figure 11A:
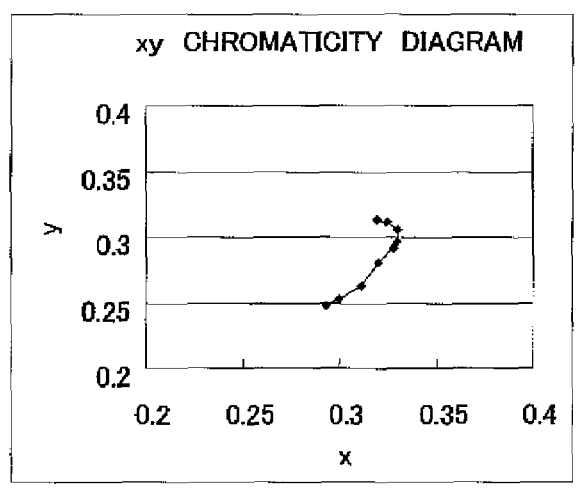
[FIG. 11] Parts (a) and (b) are measurement results of a color shift of a liquid crystal panel of Comparative Example 2, and part (c) is a radar chart showing viewing angle dependence of a contrast of the liquid crystal panel of Comparative Example 2.
Figure 11B:
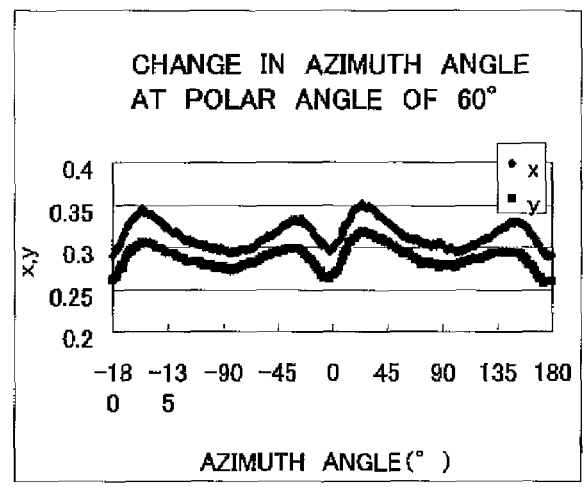
Figure 11C:
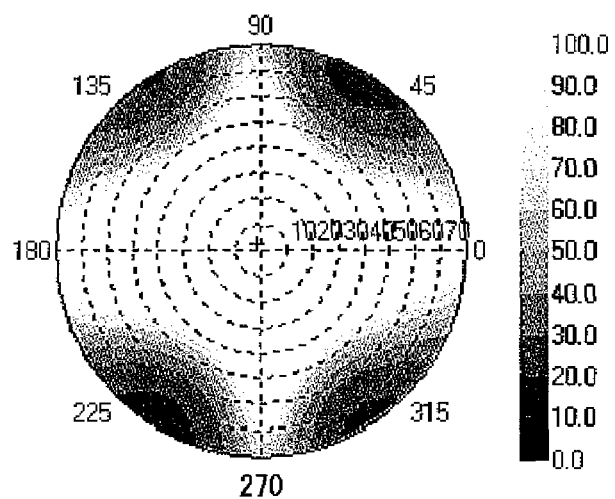

A polarizing plate (manufactured by Nitto Denko Corporation, trade name: SEG1224) was attached to the viewer side of a liquid crystal cell similar to that used in Example 1 via an adhesive (thickness: 20 μm). On the backlight side of the liquid crystal cell, the polarizing plate with a second optical compensation layer obtained in the above was attached via an adhesive (thickness: 20 μm). At this time, the polarizing plate with a second optical compensation layer was attached to the liquid crystal cell so that the second optical compensation layer was placed on the liquid crystal cell side. Further, the polarizing plates were laminated so that stretching (absorption) axes of polarizers sandwiching the liquid crystal cell were substantially perpendicular to each other, whereby a liquid crystal panel was obtained. The measurement results of a color shift obtained by changing a polar angle in a range of 0° to 80° in a direction of an azimuth angle of 45° in the liquid crystal display apparatus produced using the obtained liquid crystal panel are shown in FIG. 11(a), and the measurement results of a color shift obtained by changing an azimuth angle in a range of 0° to 360° in a direction of a polar angle of 60° are shown in FIG. 11(b). Further, the viewing angle dependence of a contrast is shown in a radar chart of FIG. 11(c).

COMPARATIVE EXAMPLE 3

Figure 12A:
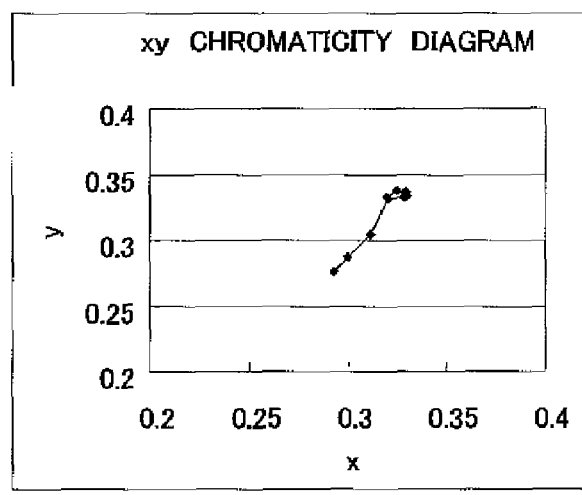
[FIG. 12] Parts (a) and (b) are measurement results of a color shift of a liquid crystal panel of Comparative Example 3, and part (c) is a radar chart showing viewing angle dependence of a contrast of the liquid crystal panel of Comparative Example 3.
Figure 12B:
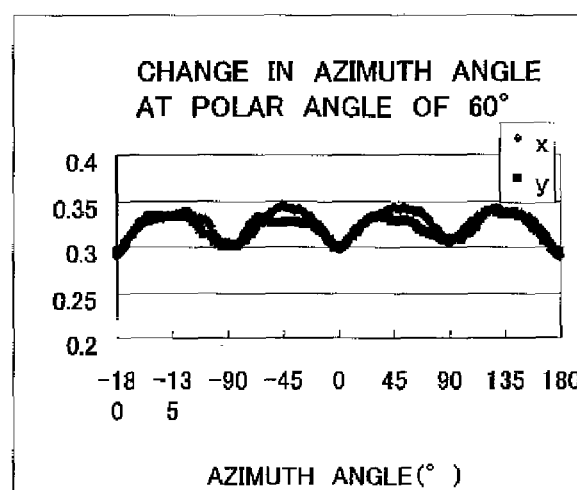
Figure 12C:
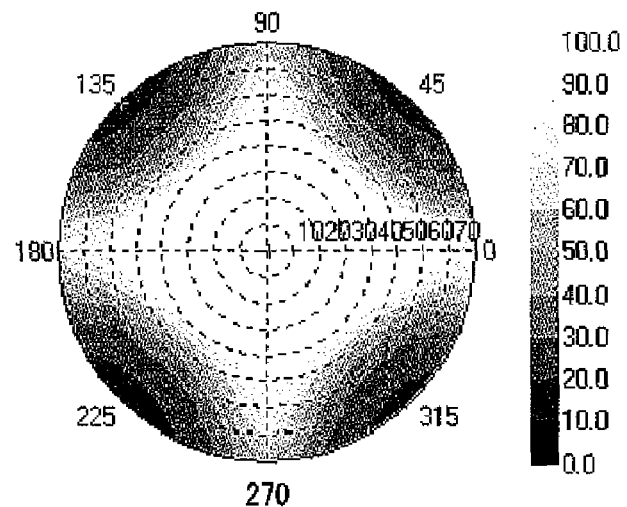

A liquid crystal panel was obtained in the same way as in Example 1, except for using a cellulose-based resin film (manufactured by Konica Minolta Holdings, Inc., trade name: KC8NYACS) was used as a first optical compensation layer and a second optical compensation layer. The in-plane retardation of the cellulose-based resin film was Δnd(380)= 37 nm, Δnd(550) 45 nm, Δnd(780) 49 nm, and the thickness direction retardation was Rth(380)=120 nm, Rth(550)=145 nm, Rth(780)=157 nm. The refractive index profile of 550 nm was nx>ny>nz. The measurement results of a color shift obtained by changing a polar angle in a range of 0° to 80° in a direction of an azimuth angle of 45° in the liquid crystal display apparatus produced using the obtained liquid crystal panel are shown in FIG. 12(a), and the measurement results of a color shift obtained by changing an azimuth angle in a range of 0° to 360° in a direction of a polar angle of 60° are shown in FIG. 12(b). Further, the viewing angle dependence of a contrast is shown in a radar chart of FIG. 12(a).

COMPARATIVE EXAMPLE 4

A polycarbonate-based resin film (manufactured by Teijin Limited., trade name: PUREACE) was used as a first optical compensation layer. The photoelastic coefficient of the polycarbonate-based resin film was $61 \times 10^{-12}$ $(m^2/N)$. The in-plane retardation was Δnd(380)=101 nm, Δnd(550)=145 nm, Δnd(780)=153 nm. The thickness direction retardation was Rth(380) 99 mm Rth(550)=141 nm, Rth(780)=149 nm. The refractive index profile of 550 nm was nx>ny≈nz.

A norbornene-based resin film (manufactured by JSR Corporation, trade name: ARTON) was biaxially stretched 1.3 times length of the original length in vertical and horizontal directions at 175° C., and used as a second optical compensation layer. The in-plane retardation of the second optical compensation layer was Δnd(380)=2 nm, Δnd(550)=2 nm, Δnd(780)=2 nm, and the thickness direction retardation was Rth(380)=244 nm, Rth(550)=220 nm, Rth(780)=218 nm. The refractive index profile of 550 nm was nx≈ny>nz.

Figure 13A:
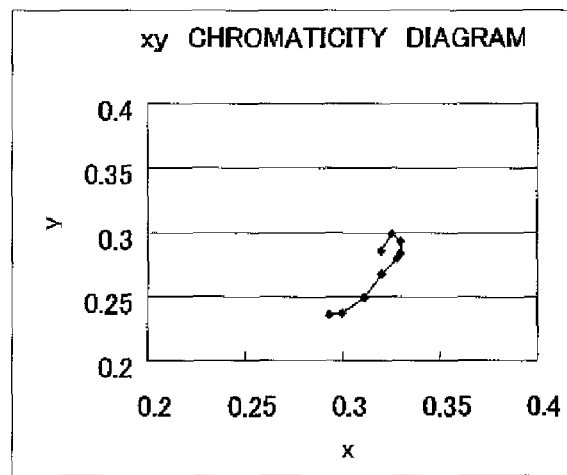
[FIG. 13] Parts 1a) and (b) are measurement results of a color shift of a liquid crystal panel of Comparative Example 4, and part (c) is a radar chart showing viewing angle dependence of a contrast of the liquid crystal panel of Comparative Example 4.
Figure 13B:
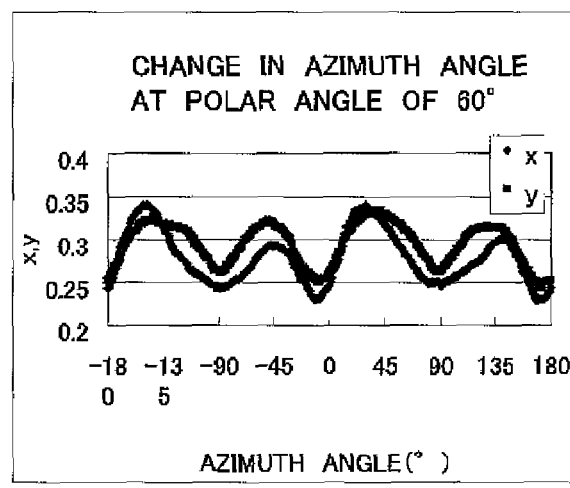
Figure 13C:
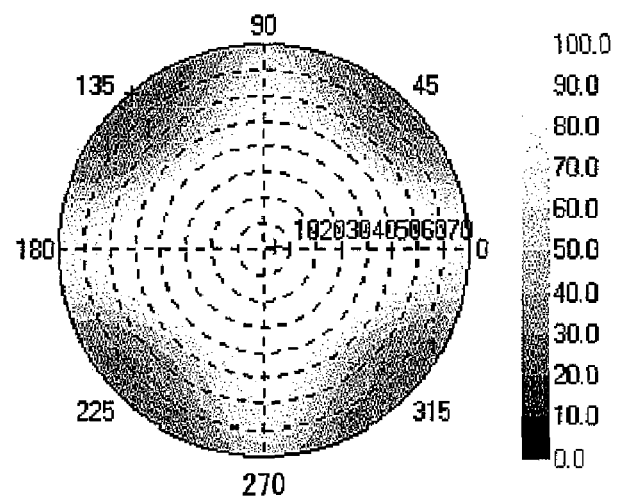

A liquid crystal panel was obtained in the same way as in Example 1, except for using the above-mentioned first optical compensation layer and second optical compensation layer. The measurement results of a color shift obtained by changing a polar angle in a range of 0° to 80° in a direction of an azimuth angle of 45° in the liquid crystal display apparatus produced using the obtained liquid crystal panel are shown in FIG. 13(*a*), and the measurement results of a color shift obtained by changing an azimuth angle in a range of 0° to 360° in a direction of a polar angle of 60° are shown in FIG. 13(*b*). Further, the viewing angle dependence of a contrast is shown in a radar chart of FIG. 13(*c*).

As is apparent from FIGS. 5-13, it is understood that the liquid crystal panels obtained in Examples 1-5 are excellent in color shift, compared with the liquid crystal panels obtained in Comparative Examples 1-4.

As is apparent from FIGS. 5-13, the liquid crystal display apparatuses according to the examples of the present invention are excellent in both a contrast in a front direction and a contrast in an oblique direction, compared with the liquid crystal display apparatuses in the comparative examples.

Figure 14A:
[FIG. 14] Part (a) is an observed photograph during a black image display of the liquid crystal display apparatus of Example 1 according to the present invention, and part (b) is an observed photograph during a black image display of a liquid crystal display apparatus of Comparative Example 4.
Figure 14B:
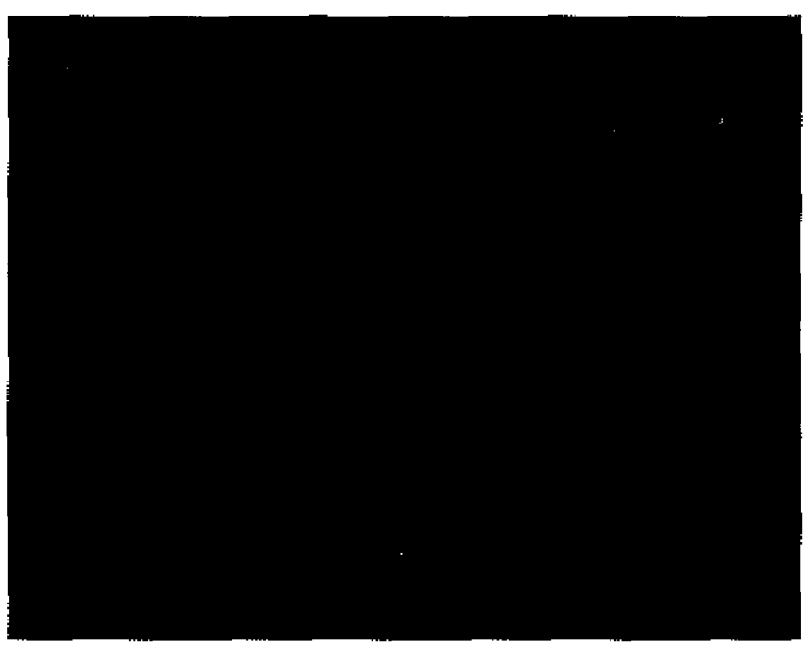

Liquid crystal display apparatuses were produced using the liquid crystal panels in Example 1 and Comparative Example 4, and the occurrence of display unevenness was observed during a black image display. FIG. 14 shows observed photographs. As shown in FIG. 14(*a*), the display unevenness was suppressed satisfactorily in the liquid crystal display apparatus of Example 1. On the other hand, as shown in FIG. 14(*b*), unevenness (light leakage in some places) occurred in the entire screen in the liquid crystal display apparatus of Comparative Example 4. As is apparent from the photographs in FIG. 14, bluing was remarkably smaller in the liquid crystal display apparatus of the present invention, compared with the liquid crystal display apparatuses of the Comparative Examples.

INDUSTRIAL APPLICABILITY

A liquid crystal panel and a liquid crystal display apparatus of the present invention are preferably applicable to a liquid crystal television, a mobile telephone, and the like.

The invention claimed is:

1. A liquid crystal panel, comprising:
   a liquid crystal cell;
   a first polarizer placed on one side of the liquid crystal cell;
   a second polarizer placed on the other side of the liquid crystal cell; and
   at least two optical compensation layers including a first optical compensation layer and a second optical compensation layer placed between the first polarizer and the second polarizer,
   wherein the first optical compensation layer has an absolute value of an photoelastic coefficient of $40 \times 10^{-12}$ (m$^2$/N) or less, has a relationship of 90 nm≦Δnd (550)≦200 mm, has relationships of the following expressions (1) and (2), and functions as a protective layer on a liquid crystal cell side of one of the first polarizer and second polarizer; and
   the second optical compensation layer has relationships of the following expressions (3) and (4):

$$\Delta nd(380) < \Delta nd(550) < \Delta nd(780) \quad (1)$$

$$nx > ny \geqq nz \quad (2)$$

$$Rth(380) > Rth(550) > Rth(780) \quad (3)$$

$$nx = ny > nz \quad (4)$$

where Δnd(380), Δnd(550), and Δnd(780) respectively represent in-plane retardations measured with a wavelength of 380 nm, 550 nm, and 780 nm at 23° C.; Rth(380), Rth(550), and Rth(780) respectively represent thickness direction retardations measured with a wavelength of 380 nm, 550 nm, and 780 nm at 23° C.; and nx, ny, and nz respectively represent refractive indices in a slow axis direction, a fast axis direction, and a thickness direction.

2. The liquid crystal panel according to claim 1, wherein the first optical compensation layer has a relationship of Δnd (780)/Δnd(550)>1.10.

3. The liquid crystal panel according to claim 1, wherein the first optical compensation layer contains a cellulose-based material.

4. The liquid crystal panel according to claim 3, wherein an acetyl substitution degree (DSac) and a propionyl substitution degree (DSpr) of the cellulose-based material are 2.0≦DSac+DSpr≦3.0, and 1.0≦DSpr≦3.0.

5. The liquid crystal panel according to claim 1, wherein the second optical compensation layer has a relationship of Rth(780)/Rth(550)<0.95.

6. The liquid crystal panel according to claim 1, wherein the second optical compensation layer is composed of a material including at least one kind of non-liquid crystalline polymer selected from the group consisting of polyamide, polyimide, polyester, polyetherketone, polyamideimide, and polyesteramide.

7. The liquid crystal panel according to claim 1, wherein the first optical compensation layer and the second optical compensation layer are placed on separate sides with respect to the liquid crystal cell.

8. A liquid crystal panel, comprising:
   a liquid crystal cell;
   a first polarizer placed on one side of the liquid crystal cell;
   a second polarizer placed on the other side of the liquid crystal cell;
   at least two optical compensation layers including a first optical compensation layer and a second optical compensation layer placed between the first polarizer and the second polarizer; and
   a protective layer placed on a liquid crystal cell side of at least one of the first polarizer and second polarizer,
   wherein the first optical compensation layer is placed on the liquid crystal cell side of the protective layer, has an absolute value of an photoelastic coefficient of $40 \times 10^{-12}$ (m$^2$/N) or less, has a relationship of 50 nm≦Δnd(550)≦150 nm, and has relationships of the following expressions (1) and (2).
   the second optical compensation layer has relationships of the following expressions (3) and (4); and the protective layer has relationships of the following expressions (5) and (6):

$$\Delta nd(380) < \Delta nd(550) < \Delta nd(780) \quad (1)$$

$$nx > ny \geq nz \quad (2)$$

$$Rth(380) > Rth(550) > Rth(780) \quad (3)$$

$$nx = ny > nz \quad (4)$$

$$0 \text{ nm} \leq \Delta nd(550) \leq 10 \text{ nm} \quad (5)$$

$$40 \text{ nm} \leq Rth(550) \leq 80 \text{ nm} \quad (6)$$

where $\Delta nd(380)$, $\Delta nd(550)$, and $\Delta nd(780)$ respectively represent in-plane retardations measured with a wavelength of 380 nm, 550 nm, and 780 nm at 23° C.: Rth(380), Rth(550), and Rth(780) respectively represent thickness direction retardations measured with a wavelength of 380 nm, 550 nm, and 780 nm at 23° C.; and nx, ny, and nz respectively represent refractive indices in a slow axis direction, a fast axis direction, and a thickness direction.

9. The liquid crystal panel according to claim 1, wherein the liquid crystal cell is in a VA mode or an OCB mode.

10. A liquid crystal display apparatus comprising the liquid crystal panel according to claim 1.

* * * * *